("12") United States Patent
Park et al.

(10) Patent No.: US 10,257,856 B2
(45) Date of Patent: Apr. 9, 2019

(54) METHOD FOR TRANSMITTING SIGNAL ON BASIS OF CLEAR CHANNEL ASSESSMENT IN UNLICENSED BAND CHANNEL, AND MOBILE COMMUNICATION SYSTEM

(71) Applicant: Samsung Electronics Co., Ltd., Suwon-si, Gyeonggi-do (KR)

(72) Inventors: Seung-Hoon Park, Seoul (KR); Sun-Heui Ryoo, Yongin-si (KR); Jung-Min Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/749,396

(22) PCT Filed: Jul. 29, 2016

(86) PCT No.: PCT/KR2016/008419
§ 371 (c)(1),
(2) Date: Jan. 31, 2018

(87) PCT Pub. No.: WO2017/023056
PCT Pub. Date: Feb. 9, 2017

(65) Prior Publication Data
US 2018/0220459 A1    Aug. 2, 2018

Related U.S. Application Data

(60) Provisional application No. 62/199,374, filed on Jul. 31, 2015.

(51) Int. Cl.
*H04W 74/00* (2009.01)
*H04W 48/10* (2009.01)
(Continued)

(52) U.S. Cl.
CPC ....... *H04W 74/0808* (2013.01); *H04W 16/14* (2013.01); *H04W 48/10* (2013.01);
(Continued)

(58) Field of Classification Search
CPC ..... H04L 12/413; H04L 1/1671; H04L 47/10; H04L 49/90; H04L 1/1835; H04L 1/1607;
(Continued)

(56) References Cited

U.S. PATENT DOCUMENTS 8,094,617 B2    1/2012  Ki et al.
2002/0115458 A1*  8/2002  Mizuno ................ H04W 74/02
                                                    455/507
(Continued)

FOREIGN PATENT DOCUMENTS

EP    2 814 296 A1    12/2014
EP    3 065 495 A1    9/2016
(Continued)

OTHER PUBLICATIONS

3GPP TR 36.889 V1.0.1, '3GPP; TSG-RAN; Study on licensed-assisted access to unlicensed spectrum (Release 13)', Jun. 8, 2015.
(Continued)

*Primary Examiner* — Nizar N Sivji
(74) *Attorney, Agent, or Firm* — Jefferson IP Law, LLP

(57) ABSTRACT

Disclosed is a 5G or pre-5G communication system for supporting a data transmission rate higher than that of a 4G communication system such as LTE. Disclosed are: a method for transmitting a signal in an unlicensed band channel on the basis of a counter reduction in the unlicensed band channel of a mobile communication system and a clear channel assessment (CCA) of the channel; and a mobile communication system, and according to an embodiment of the present disclosure, the method for transmitting a signal in an unlicensed band channel on the basis of a counter
(Continued)

reduction in the unlicensed band channel of a mobile communication system and a clear channel assessment (CCA) of the channel comprises the steps of: reducing the counter and performing a CCA for the channel, during a first period of transmitting a discovery signal and data; storing the reduced counter when a second period of transmitting only the discovery signal without the data is started; reducing the counter by using the stored counter and performing the CCA for the channel when a third period of transmitting the discovery signal and the data is started; and transmitting the discovery signal or the data on the channel on the basis of the counter value.

16 Claims, 19 Drawing Sheets

(51) Int. Cl.
  *H04W 16/14* (2009.01)
  *H04W 72/12* (2009.01)
  *H04W 74/08* (2009.01)
(52) U.S. Cl.
  CPC ....... *H04W 72/1273* (2013.01); *H04W 74/00* (2013.01); *H04W 74/08* (2013.01)
(58) Field of Classification Search
  CPC ..... H04L 1/188; H04L 27/2602; H04L 29/06; H04L 12/4035; H04W 84/12; H04W 74/00; H04W 74/0808; H04W 74/0816; H04J 14/0226; H04J 3/1617
  See application file for complete search history.

(56) References Cited

U.S. PATENT DOCUMENTS

| | | |
|---|---|---|
| 2013/0229995 A1* | 9/2013 | Cai ................. H04W 72/10 370/329 |
| 2015/0057008 A1 | 2/2015 | Seok |
| 2016/0021680 A1 | 1/2016 | Choi et al. |
| 2016/0205647 A1 | 7/2016 | Seo et al. |
| 2016/0262170 A1 | 9/2016 | Lee et al. |
| 2017/0318607 A1* | 11/2017 | Tiirola ............. H04W 74/0808 |

FOREIGN PATENT DOCUMENTS

| | | |
|---|---|---|
| EP | 3 076 729 A1 | 10/2016 |
| KR | 10-2016-0131390 A | 11/2016 |
| WO | 2013-119097 A1 | 8/2013 |
| WO | 2013-122415 A1 | 8/2013 |
| WO | 2015-064922 A1 | 5/2015 |
| WO | 2015-080488 A1 | 6/2015 |

OTHER PUBLICATIONS

"3rd Generation Partnership Project; Technical Specification Group Radio Access Network; Study on Licensed-Assisted Access to Unlicensed Spectrum; (Release 13);3GPP TR 36.889", ETSI Draft; 3GPP TR 36.889, European Telecommunications Standards Institute (ETSI), 650, Route Des Lucioles, F-06921 Sophia-Antipolis; France, vol. BRAN, No. VI.0.1, Jun. 23, 2015 (Jun. 23, 2015), pp. 1-87, XP014249098.

European Search Report dated Feb. 11, 2019, issued in European Application No. 16833292.2.

* cited by examiner

METHOD FOR TRANSMITTING SIGNAL ON BASIS OF CLEAR CHANNEL ASSESSMENT IN UNLICENSED BAND CHANNEL, AND MOBILE COMMUNICATION SYSTEM

TECHNICAL FIELD

The present disclosure relates to a structure and procedure for controlling transmission/reception operations on unlicensed or shared license bands.

BACKGROUND ART

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Conventional mobile communication systems, 3GPP LTE and LTE-A, have been designed assuming that they are served on licensed frequency bands. Licensed band frequencies have been able to serve efficiently through their exclusive use.

However, as mobile communication systems go beyond voice-centered services that they initially intended and are involving soaring use of high-speed, high-quality wireless packet data, a need comes along to increase the capacity. An approach to increase the overall capacity of mobile communication system may be to enable the LTE-A system to operate on shared bands, in particular, unlicensed bands.

Meanwhile, since shared bands cannot be in exclusive use, if a particular frequency at which LTE-A system operates belongs to a shared band, such a case may arise that some LTE-A subframes cannot be used due to use restrictions on the unlicensed band or transmission by other wireless transmitters that are sharing the unlicensed band.

A communication system using an unlicensed band frequency should discontinuously or in chances use the unlicensed band frequency to co-exist with neighbor unlicensed band systems. Accordingly, transmission reliability may be lowered in control channels and shared channels used in mobile communication system.

DETAILED DESCRIPTION OF THE INVENTION

Technical Problem

The present disclosure addresses the problem that LTE-A systems using unlicensed band frequencies cannot transmit discovery signals at constant cycles due to restrictions on shared channels or interference by other LTE-A devices and the problem that when a discovery signal is transmitted while CCA is performed for data transmission, the counter is reset to delay access to the channel for data transmission.

Technical Solution

To address the above problems, according to the present disclosure, a method for transmitting a signal on an unlicensed band channel of a mobile communication system based on a reduction in counter on the unlicensed band channel and a clear channel assessment (CCA) of the channel comprises the operations of reducing the counter and performing the CCA on the channel during a first period when a discovery signal and data are transmitted, storing the reduced counter if a second period when the discovery signal is transmitted but the data is not transmitted begins, reducing the counter and performing the CCA on the channel using the stored counter if a third period when the discovery signal and the data are transmitted begins, and transmitting the discovery signal or the data on the channel based on the counter value.

Further, an LBT parameter set for transmitting only the discovery signal differs from an LBT parameter set for transmitting the discovery signal and the data.

Also, a mobile communication system transmitting a signal based on a reduction in counter using an unlicensed band channel and a clear channel assessment (CCA) of the channel reduces the counter and performing the CCA on the channel during a first period when a discovery signal and data are transmitted, stores the reduced counter if a second period when the discovery signal is transmitted but the data is not transmitted begins, reduces the counter and performing the CCA on the channel using the stored counter if a third period when the discovery signal and the data are transmitted begins, and transmits the discovery signal or the data on the channel based on the counter value.

Effects of the Invention

According to the present disclosure, different LBT parameter values are applied when control signals are transmitted and when data is transmitted, enhancing the priority of discovery signals.

According to the present disclosure, where transmission of a discovery signal is initiated while CCA is performed, the counter reduced while performing the CCA may be stored, and the stored counter may be loaded when the transmission of the discovery signal is ended, thereby preventing delay in data transmission.

BRIEF DESCRIPTION OF THE DRAWINGS

FIG. 3B is a view illustrating operations where the LBT scheme is load based equipment (LBE)

MODE FOR CARRYING OUT THE INVENTION

Figure 1A:
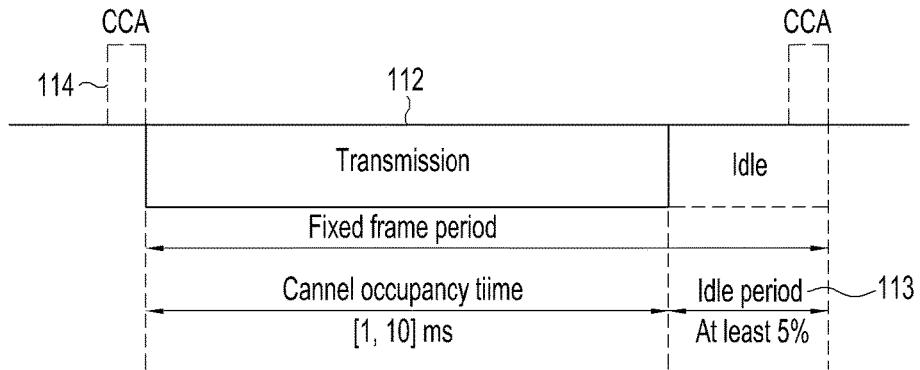
FIG. 1A is a view illustrating an FBE operation over time according to an unlicensed band restriction.

Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The present disclosure relates to a method and apparatus for transmitting signals on a cellular network using a shared band and includes a base station and a user equipment (UE).

The base station is an entity communicating with the UE and may be denoted as, e.g., a BS, a base transceiver system (BTS), a NodeB (NB), an eNodeB (eNB), or an access point (AP).

In particular, the present disclosure focuses primarily on a heterogeneous network in which base stations consist of main base stations and assistant base stations. The main base station may be referred to as a macro BS or PCell, and the assistant base station may be referred to as a small BS or SCell.

The user equipment is an entity communicating with a base station and may be denoted UE, device, mobile station (MS), mobile equipment (ME), or terminal.

In a heterogeneous network, a UE communicates with a primary cell (PCell) for traffic sensitive to mobility, such as main system information, control signal transmissions/receptions or voices, and communicates with a secondary cell (SCell) for traffic critical for instantaneous transmissions such as data. In the present disclosure, the SCell is assumed to have been set with a shared band. An example of such type of cellular communication system may be the LTE license-assisted access (LAA) standard. In this disclosure, the UE using only existing licensed bands is denoted LTE UE, and UE additionally using a shared band is denoted LAA UE.

The operations of a UE and a base station in a heterogeneous network are described. The UE in the coverage of the base station may be in an RRC IDLE state or RRC CONNECTED state. In the RRC_IDLE state, the UE selects a base station (or cell), monitors paging channels, and obtains system information (SI). However, the UE is not in the state of communicating data with the base station. Such UE is referred to as camping on the base station. Meanwhile, in the RRC_CONNECTED state, the UE monitors control channels, communicates data with a base station through a data channel, and reports various measurement results of the base station and neighbor base stations to assist the base station in scheduling. Such UE receives services from the base station. The base station is referred to as a serving cell for the UE it is serving.

Since the present disclosure is based on carrier aggregation (CA) and small cell technology among the 3GPP LTE advanced standards, CA and small cell techniques are described.

CA has been designed to expand transmission/reception designed for a single legacy licensed band into multiple bands. Here, the single legacy licensed band is referred to as the primary component carrier (PCC), and the expanded bands are referred to as secondary component carriers (SCCs). Setting/managing connection with network and controlling mobility are performed through PCC and data transmission is performed through SCC. The base station and UE require a separate RF circuit to support the expanded bands. Where the band to be expanded is a shared band, resource access technology, such as listen-before-talk (LBT), should be considered for co-existence in contrast to legacy licensed bands.

Small cell technology is a way to slim down base stations to respond to increasing demand for data. Such small base stations are denoted small cells, small eNBs, or SeNBs. As the base station slims down, the UE's signal-to-noise ratio (SNR) is increases as much, and the capacity of the base station may be raised up accordingly. However, small base stations may cause an increase in overall interference due to a reduced inter-base station distance and an increase in the number of neighbor base stations. Further, since small base stations have small coverage, they may experience a larger variation, in the number of UEs in the coverage or in the number of traffic requests from the UE, than macro base stations (macro eNBs or MeNBs). Accordingly, small base stations with no traffic request may be controlled in an inactive (OFF or idle) state in which they are not used. Since idle small base stations do not transmit even reference signals, the overall interference reduces, and the UE's capacity of receiving a reference signal from an active small base station may be enhanced.

Two cell groups are defined as follows to perform base station access and mobility control separately for the MeNB cell and the SeNB cell. One of the cell groups is master cell group (MCG) which is an MeNB serving cell group consisting of one primary cell (PCell) and up to N secondary cells (SCells). The other of the cell groups is secondary cell group (SCG) which is an SeNB serving cell group consisting of one physical uplink shared channel (PUSCH) (or primary) secondary cell (PSCell) and up to N secondary cells (SCells). Meanwhile, for SCG, in contrast to MCG, PSCell is defined instead of PCell, and is always active contrary to secondary cell. PCell is in charge of random access, uplink control channel (PUCCH), channel quality measurement, mobility control, and security functions. In contrast, PSCell is in charge of random access, PUCCH, and channel quality measurement.

Embodiments of the present disclosure are described below in detail.

[UE's Channel Quality Measurement and Reporting]
1. Listen Before Talk (LBT).

To use an unlicensed band, the base station should determine whether other devices are using the unlicensed band. Listen before talk (LBT) to that end is the operation of determining whether other devices are currently using the unlicensed band. Rules exist for LBT. LBT is achieved by clear channel assessment (CCA). CCA is the operation of the transmitter measuring the level of interference to determine whether other devices are now using the unlicensed band. Where the level of interference with the unlicensed band channel is a predetermined value or more as a result of CCA, it is determined that the unlicensed band is now being used by another device, and transmission is not performed. Where the interference level is less than the predetermined value, no other devices are determined to be using the unlicensed band, and transmission is performed.

Meanwhile, as devices using an unlicensed band, there are frame based equipment (FBE) and load based equipment (LBE), and each equipment should follow regulations.

Figure 1B:
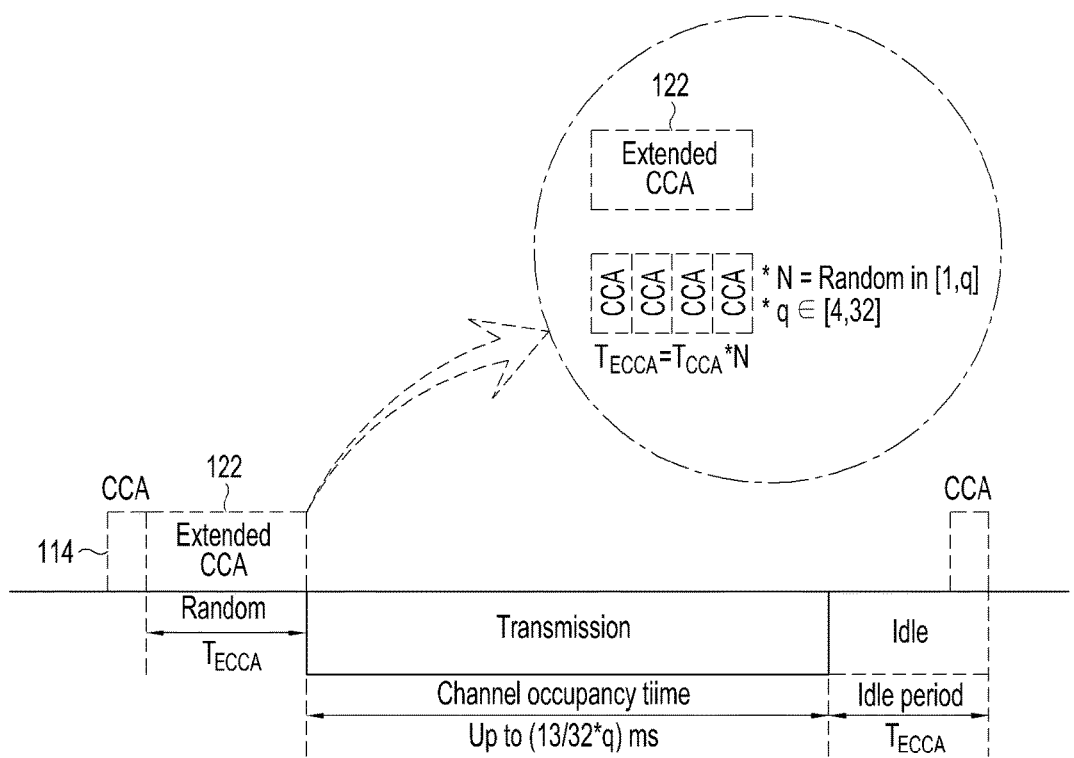
FIG. 1B is a view illustrating an LBE operation over time according to an unlicensed band restriction.

FIG. 1A is a view illustrating an FBE operation over time according to an unlicensed band restriction. FIG. 1B is a view illustrating an LBE operation over time according to an unlicensed band restriction.

Referring to FIG. 1A, operations over time of an FBE as per unlicensed band regulations are described. In the case of FBE, CCA 111 should be performed before the transmitter (e.g., LAA UE) performs transmission. At this time, as an example, CCA should be carried out for at least 20 μs.

If no other devices are determined to occupy the unlicensed band as a result of CCA 111, the transmitter may occupy the unlicensed band. That is, the transmitter may occupy the unlicensed band with only one CCA 111. At this time, the channel occupancy time (COT) 112 during which the unlicensed band can be occupied is from minimum 1 ms to maximum 10 ms. Thereafter, it should take a rest without performing transmission for at least 5% of the occupancy time. This is called idle period 113.

If another device is determined to be currently using the unlicensed band as a result of CCA on FBE, the FBE may repeat CCA after a fixed frame period 114 elapses.

As shown in FIG. 1B, for LBE, like FEB, CCA 121 should be performed before the transmitter performs transmission. At this time, CCA 121 should be performed for at least 20 μs.

Upon determining as a result of CCA 121 that no other devices are now using the unlicensed band, the transmitter performs transmission. However, upon determining that another device is now using the unlicensed band, the transmitter may perform additional CCA in the LBE scheme (unlike in the FBE scheme). This is called extended CCA (ECCA) 122. ECCA 122 consists of N CCAs, where N is any value selected from [1, q], q is the size of a contention window (CW) and is set as a value in the CW range. When CCA succeeds, i.e., when no other devices are using the unlicensed band, the CCA counter is reduced by 1. Upon detecting band occupancy before the CCA counter becomes 0, freezing is performed in which it waits until the band occupancy is released with the CCA counter stored. Upon detecting that the band is available, the operation of reducing the CCA counter is resumed. Upon determining that no devices are currently using the unlicensed band when the CCA counter becomes 0, the transmitter may perform transmission after the last CCA period. At this time, the channel occupancy time 211 during which the LBE may occupy the unlicensed band is up to (13/32)*q ms, and it may then repeat ECCA to have an idle period for the time.

FBE and LBE have their own advantages and disadvantages. First, in light of the chance of occupying unlicensed band, LBE would be better in performance than FBE. This is why FBE, once CCA fails, cannot repeat it during the fixed frame period while LBE, although CCA fails, may perform N additional CCAs to occupy the unlicensed band. From a point of view of scheduling, i.e., physical downlink control channel (PDCCH) transmission, FBE has the advantage of simplicity over LBE. FBE may use an unlicensed band with respect to a subframe boundary, i.e., PDCCH transmission time. Since FBE and LBE have their own pros and cons as described above, a LBE method modified to mix FBE and LBE operations may be used.

Figure 1C:
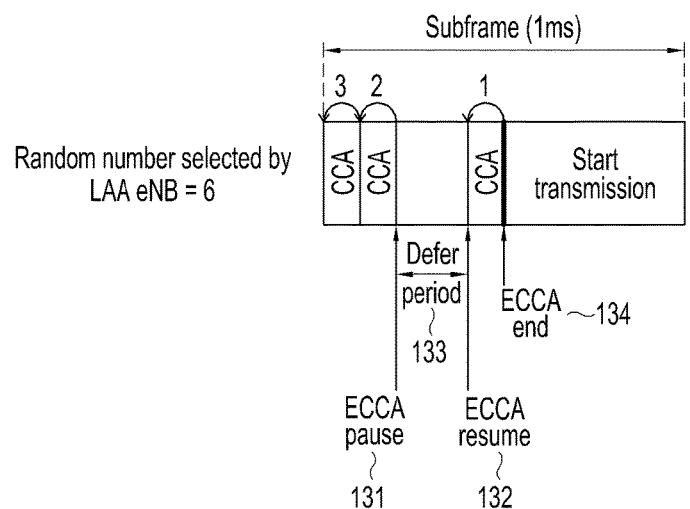
FIGS. 1C and 1D are views illustrating examples of varied LBE operations.
Figure 1D:
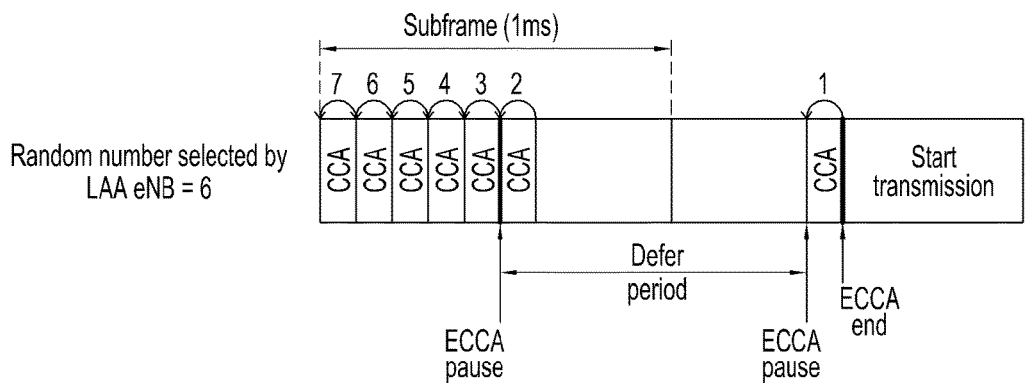

FIGS. 1C and 1D are views illustrating examples of varied LBE operations. As shown in FIG. 1C, as per the modified LBE method, the transmitter (base station or UE) operates similar to normal LBE method but waits (i.e., defer) 133 without performing further ECCA at the time $T_{131}$ when one is left for the ECCA counter. The defer operation is performed until the time $T_{132}$ set by the base station or UE. ECCA is performed at the set time $T_{132}$, and if resources are identified as being empty, the last ECCA number is counted, and transmission is immediately initiated. Unless it arrives at the last ECCA number until the set time, the same operation may be performed for a next set time. Meanwhile, the modified LBE method as shown in FIG. 1D is similar to that shown in FIG. 1C but differs in that the end time of the defer period is set as a next subframe.

The modified LBE method is useful particularly when the base station raises frequency reuse efficiency by performing transmission at the same time for neighbor base stations or when the base station performs transmission at the same time to mitigate mutual transmission/reception interference between multiple channels. Further, the modified LBE method may address the problem that only one of neighbor UEs can perform transmission due to failure in mutual CCA between UEs on uplink.

As described above, the UE requires a way to allow the UE to remain accessing the licensed band to provide reliable cellular communication services in mobile environments despite using the unlicensed band. Accordingly, possible data transmission rate may be enhanced by providing voice or delay-sensitive services through the licensed band and data services through an unlicensed band added to the licensed band.

The following procedure is required to determine the transmission capacity of transmission/reception link in LTE or other cellular communication. For downlink, the UE measures a reference signal of the base station and reports signal quality to the base station. As reference signal of the base station, common/cell-specific reference signal (CRS), discovery reference signal (DRS), or channel state information-reference signal (CSI-RS), which are commonly given to all UEs within the coverage of the base station, or dedicated/demodulation reference signal (DMRS) given to a particular UE may be used. The UE may be controlled by the base station to periodically or aperiodically report channel quality to the base station through a channel quality indicator (CQI). The UE uses an uplink control channel for periodic reporting and an uplink data channel for aperiodic reporting. The base station performs a scheduling process for determining the UE to be allocated a physical channel resource block based on the CQI reported by the UE and provides per-UE allocation information as per the result. The allocation information is known through a control signal scrambled with the C-radio network temporary identifier (C-RNTI) or M-RNTI of the UE through the downlink control channel PDCCH, and the UE receiving the same receives the allocated physical channel resource block from the downlink data channel (PDSCH) given through the control signal.

Meanwhile, on uplink, the reference signal of the UE may be measured by the base station, and signal quality may be known. As reference signals of the UE, sounding reference signal (SRS) allocated by the base station to a particular UE periodically (2 ms to 320 ms) may be used. Although different from current standards, it may also be considered to use demodulation reference signal (DMRS) that is transmitted together upon uplink data transmission by the UE for operations on the shared band. The base station performs a scheduling process for determining the UE to be allocated a physical channel resource block (RB) based on the CQI obtained by measuring the reference signal sent from the UE and provides per-UE allocation information as per the result. The allocation information is known through a control signal scrambled with C-RNTI or M-RNTI of the UE through the downlink control channel PDCCH, and the UE receiving the same transmits the allocated physical channel resource block from the uplink data channel (PUSCH) given through the control signal.

Meanwhile, the base station may transmit a reference signal to measure the channel quality of the UE in the period during which the base station does not transmit data. However, transmission of a reference signal should also be designed as per shared band regulations.

2. DRS Transmission/Reception on Licensed Band

The RRC_CONNECTED UE receives configuration information for measurement through an individual control signal (dedicated signal) of the base station. For example, the base station may control measurement and reporting of the UE with a RRCConnectionReconfiguration message.

There are two measurement methods in radio access technology (RAT), classified into intra-frequency measurement for at least one or more downlink carrier frequencies of serving cell and inter-frequency measurement for other frequency than the serving cell downlink carriers.

The individual control signal of the base station for measurement of the UE may include at least one of measurement objects, reporting configurations, measurement identifiers, quantity configurations, and measurement gaps information.

The measurement object is a target that the UE performs measurement for, which denotes one carrier in the same RAT. For one carrier, per-cell offsets in the network and a list of blacklist cells which are not considered in measurement may be set. Reporting configuration consists of a plurality of reporting method configurations. Each reporting method includes reporting conditions (periodic or single event) and reporting formats (cell count reported, transmit power, or other contents reported by the UE). The measurement identity has been introduced to represent the measurement object and reporting configuration in bundle. For example, a plurality of carriers may be connected to one reporting configuration, and a plurality of reporting configurations may be applied to one carrier. When the UE performs measurement reporting, the measurement identity is used as a reference number. The quantity configuration is set per RAT. Quantitative indexes to be measured and their relevant filtering are defined from the measurement object. For example, settable are whether to report reference signal received power (RSRP) or reference signal received quality (RSRQ) for a particular carrier and what filtering method is to be used. The measurement gap sets the period and length of a measurement gap at which measurement is possible when the UE is in the RRC_CONNECTED state.

Additional considerations have been reflected to apply the above measurement methods to small cells. In small cell environments, activation or deactivation of small base stations may be frequent in light of interference control/avoidance between small cells, traffic load control, and power savings. Of course, among small base stations, PSCells should always remain in the active state as do macro eNBs.

DRS has been introduced for the purpose of increasing the transmission capacity of UE by allowing some of reference signals sent out by small base stations when they are in active state to be sent out even when they are in inactive state. However, small base stations may send DRSs even in the active state as necessary. Reference signals included in DRSs include a synchronization signal, a common or cell-specific reference signal, and a channel state indicator reference signal (CSI-RS). As synchronization signals, a primary synchronization signal (PSS) for rough synchronization and a secondary synchronization signal (SSS) for delivery of additional system information are present. The synchronization signal and common reference signal (CRS) are used for time frequency synchronization, and the channel state indicator reference signal (CSI-RS) may be set additionally. When only the CRS is used, the UE may perform measurement with the CRS. When the CSI-RS is set, the UE performs measurement with only the CSI-RS, excluding the CRS.

Measurement of an RS may be performed differently with the RSRP, RSRQ, or RSSI.

RSRP [dBm]: may be obtained by receive power linear averaging all resource elements where the RS is sent with the total power of reference signal RS received by the UE. This is applicable to both RRC_Idle and RRC_CONNECTED UEs. As per LTE TS 36.211, R0 CRS is basically used for measurement. Depending on UEs, R0 and R1 CRSs both may also be used.

RSRQ [dB]: is a ratio of receive power for RS to all power received by the UE and is represented as (RSRP/RSSI) *N_RB. N_RB refers to the number of resource blocks corresponding to the bandwidth of the carrier that measures received power strength indicator (RSSI). This is appled to only RRC_CONNECTED UEs.

RSSI [dBm]: is the total sum of all power received by the UE and is a value including all noise and interference.

If the small base station is set to transmit periodic DRSs and the UE is set to measure DRSs, the UE may discover a new small base station or perform measurement on serving base station signals. The small base station follows one setting method when it attempts to send a DRS for one among possible carriers. The base station sends a DRS over continuous subframes. It may be set as one to five subframes for FDD and as two to five subframes for TDD. Such continuous DRS transmission period is called a DRS occasion. The base station may configure the DRS occasion as a particular period (e.g., 40 ms or 80 ms). The particular period may be determined by the base station's determination considering the DRS measurement period set for the UE. The base station may set the length of one DRS occasion for a certain frequency as ds-OccasionDuration.

The base station may make a configuration, called discovery signals measurement timing configuration (DMTC), for DRS measurement. DMTC may previously include a DMTC-offset which is a subframe gap from system frame number (SFN) 0 that is a base station reference time and a DRS measurement period (DMTC-periodicity). The UE predicts that a DRS occasion be received at each DMTC-periodicity from the subframe that the DMTC-offset indicates. Accordingly, the base station controls DRS transmission to start the first DRS occasion from the subframe that the DMTC-offset indicates. Specifically, the UE should perform DRS measurement in SFN subframes that meet subframe conditions and the following SFN and the first DRS subframe that is indicated as per the DMTC-offset set by the base station.

SFN mod $T$=FLOOR(dmtc-Offset/10);

subframe=dmtc-Offset mod 10;

with $T$=dmtc-Periodicity/10;

DRS consists of PSS/SSS and CRS, and may optionally include CSI-RS. The position of transmission in the downlink subframe of each signal is determined as follows.

Cell-specific reference signal (CRS): may be transmitted in antenna ports 0 of all downlink subframes and downlink periods (DwPTS) of all special subframes (subframes inserted upon switching from downlink to uplink in TDD).

Primary synchronization signal (PSS): may be sent in the first subframe in the FDD frame architecture or the second subframe in the TDD frame architecture.

Secondary synchronization signal (SSS): may be sent in the first subframe of the DMTC periodicity.

Non-zero-power (NZP) CSI-RS: may be sent in 0 or multiple subframes within the DMTC periodicity. CSI-RS periodi and offset are also set by the base station. The frequency position of CSI-RS in the subframe is determined as per the bitmap set by the base station.

The DMTC configuration information defined in the Rel-12 standards includes the following information per frequency.

DMTC periodicity(40 ms, 80 ms, 160 ms)
DMTC offset
Maximum allowed measurement bandwidth
Neighbor cell/TP list The following information is set for each transmission point (TP) belonging to the neighbor cell/TP list.

PCI (physical layer cell ID)
Information about CSI-RS (scrambling ID, RE configuration)
CSI-RS subframe offset (position in DRS occasion)
MBSFN subframe configurations
TDD UL-DL configurations (in case of TDD)

RRM measurement that the UE performs in DMTC is based on DRS. Where only CRS port 0 is transmitted with DRS, existing Rel-8 RSRP may apply as it is. Where CSI-RS port 15 is also transmitted with DRS, CSI-RSRP may be measured based on the received strength of CSI-RS. Where DRS is transmitted with CRS port 0 and the UE measures RSRQ, RSSI is measured in all OFDM symbols of the corresponding DRS subframe. Where the subframe measuring RSRQ is designated when measuring RSRQ, this follows the definition that RSSI is measured in all OFDM symbols in the corresponding subframe. This is why DRS may also be interpreted as subframe able to measure RSRQ having been designated.

Meanwhile, upon applying the DRS transmission/reception procedure for the above-described licensed band to unlicensed bands or shared bands, the design needs to be modified given the failure to alway occupy channel.

3. Normal DRS Transmission/Reception on Unlicensed Band

Since listen before talk (LBT) should be operated as per the determination by the transmitter, it is difficult for the receiver to determine the same if the transmitter does not inform the receiver of success or failure in LBT. The schemes of using unlicensed band/shared band based on carrier aggregation (CA) are advantageous of being able to provide LBT success/failure-related information through PCC which is a licensed band.

Figure 2:
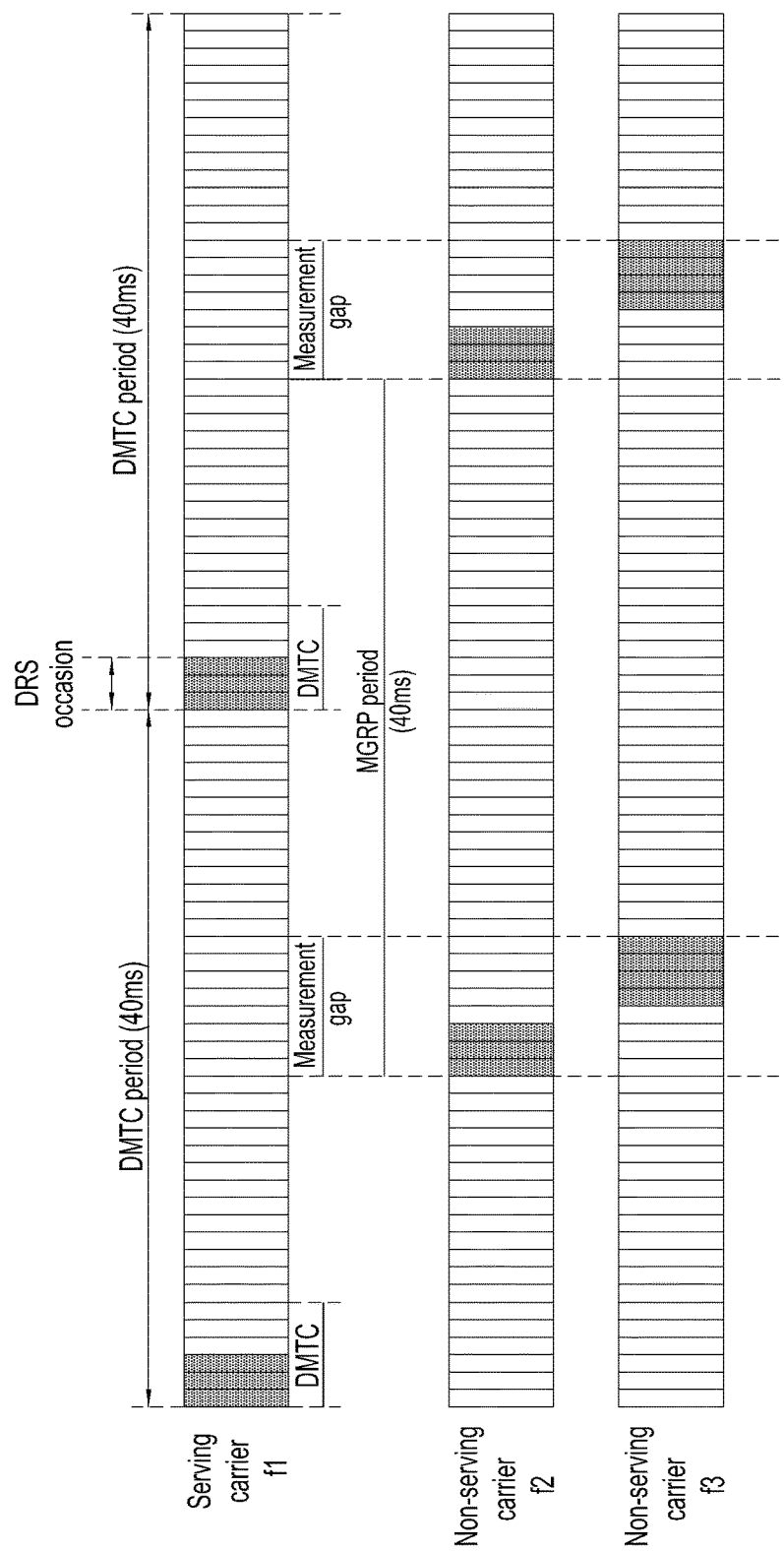
FIG. 2 is a view illustrating a general DRS measurement method over time.

FIG. 2 is a view illustrating a general DRS measurement method over time.

The description is made based on existing radio resource management (RRM). The operation of the UE measuring a plurality of inter-frequency measurements while following DMTC configurations is varied depending on how the UE is implemented.

Referring to FIG. 2, an example of a normal DRS measurement method is described.

In FIG. 2, f1 is a serving carrier of a serving cell receiving a service from the base station, and f2 and f3 are non-serving carriers of a non-serving cell that does not receive a service from the base station.

The UE set with a measurement gap reception period (MGRP) of 40 ms and a measuremeng gap of 6 ms may perform measurement on one carrier every 40 ms for the plurality of possible non-serving carriers f1 and f2, determine what subframe of CRS port 0 a signal is sent in, and determine whether the base station is on or off.

That is, the base station may perform LBT on one SCC in the mth SFN and nth subframe, and if LBT succeeds, the base station may send a DRS. The mth SFN and the nth subframe are timings at which the base station sends a DRS so that the UE may receive as per the DMTC configuration of the UE.

Meanwhile, if the channel has been occupied as a result of performing LBT in the mth SFN and the nth subframe previously determined by the DMTC configuration, the base station may perform a different operation as per the LBT scheme.

LBT schemes may be divided largely into FBE and LBE.

Figure 3A:
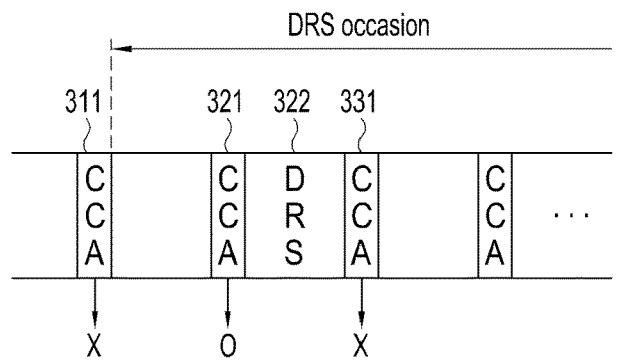
FIGS. 3A and 3B are views illustrating operations where an LBT scheme is frame based equipment (FBE)
Figure 3B:
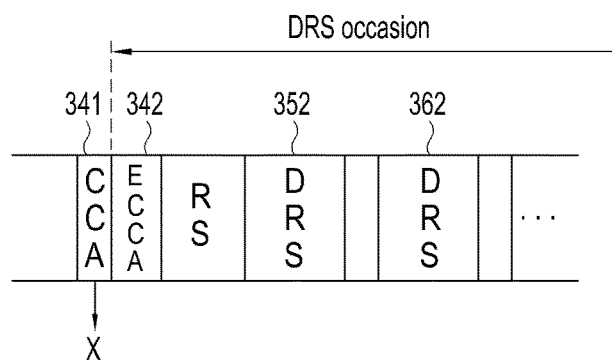
Figure 3C:
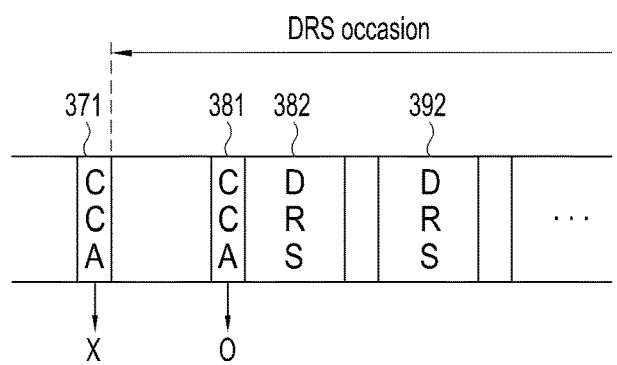
FIG. 3C is a view illustrating operations where the LBT scheme is LBE.
Figure 4A:
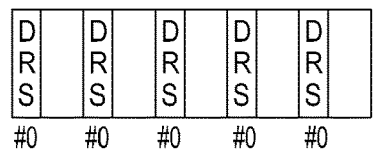
FIGS. 4A to 4D are views illustrating examples of providing information about whether DRS transmission succeeds using a bitmap method according to an embodiment of the present disclosure.
Figure 4B:
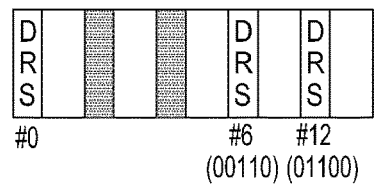
Figure 4C:
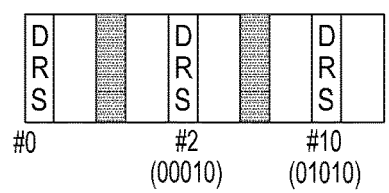
Figure 4D:
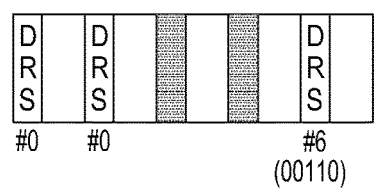
Figure 5A:
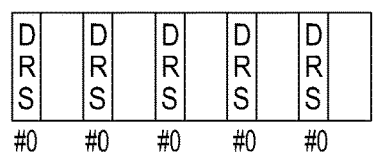
FIGS. 5A to 5D are views illustrating examples of providing information about whether DRS transmission succeeds using a busy counter according to an embodiment of the present disclosure.
Figure 5B:
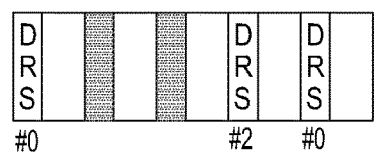
Figure 5C:
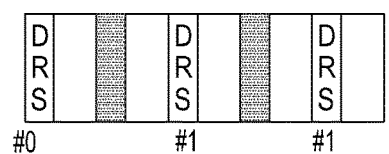
Figure 5D:
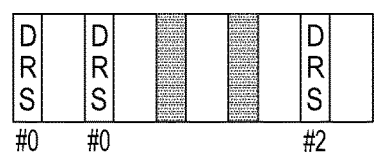

FIGS. 3A, 3B, and 3C, respectively, are views illustrating different examples when the LBT sheme as per the DMTC configuration is FBE, when the LBT scheme is LBE, and when the LBT scheme is FBE.

As shown in FIG. 3A, upon following the FBE scheme, periodic CCA is performed. If CCA 311 fails (i.e., is being occupied), transmission is stopped until a CCA chance 321 for a next DRS comes. If CCA 321 succeeds (i.e., is not occupied), DRS 322 is immediately transmitted. In other words, if the FBE scheme is followed when the base station sends a DRS, CCA is performed in each subframe (e.g., 1 ms) within the DRS occasion and if it succeeds, DRS is immediately sent in the determined position within the subframe, similar to the existing DRS transmission scheme.

As shown in FIG. 3B, where the LBE scheme is followed, the counter reduces whenever CCA 312 succeeds, and if the counter becomes 0, it is immediately sent. In contrast, where CCA fails, extended CCA (ECCA) consisting of multiple CCAs is performed until the counter becomes 0. The counter decreases whenever CCA succeeds, and if the counter becomes 0, DRS 362 is transmitted. Further, if the CCA counter becomes 0 before the time of DRS transmission, a reservation signal (RS) is sent to secure the channel, and it may be sent in the determined position within the subframe where DRS has been set in the DRS occasion.

As shown in FIG. 3C, as an example of following the FBE scheme, if CCA 381 performed right before DRS occasion succeeds, DRSs 382 and 392 are sent continuously in all subframes where DRSs have been set within the DRS occasion.

As another example of following the LBE scheme, a reservation signal is sent to secure the channel if the CCA counter becomes 0 right before the DRS occasion, and DRS is sent continuously in the subframe where DRS has been set within the DRS occasion. A reservation signal (RS) may be sent between continuous DRS transmission symbols or data (e.g., SIB) may be sent in the PDSCH region to secure the channel. This is similar to sending a reservation signal (RS) in the interval between DRS 352 and DRS 362 in the DRS occasion period of FIG. 3B.

Given LBE, LBE parameters for DRS transmission may be set to differ from LBE parameters for data transmission in PDSCH. For example, different contention window (CW) maximum values may be set for DRS transmission and data transmission. Specifically, the maximum CW value for DRS transmission may be set to be smaller than the maximum CW value for data transmission. Or, the minimum CW value for DRS transmission may be set to be smaller than the minimum CW value for data transmission. Or, the maximum CW value for DRS transmission may be set to be smaller than the minimum CW value for data transmission. If the counter is small, the count for CCA success is required to be small until the counter becomes 0. Thus, the counter being small may more quickly send DRSs than the counter being large.

Meanwhile, in the case of sending DRSs using FBE or LBE scheme of LBT, the UE may have two ambiguous scenarios in DRS reception. The first scenario is that, although the base station has sent a DRS at a determined time, the UE fails to receive the DRS due to, e.g., interference. The second scenario is that the base station fails to send a DRS at a determined time due to LBT, and the UE thus fails to receive a DRs at a determined time.

Since the UE cannot distinguish between the two scenarios, the UE is not assured for results of performing measurement of, e.g., RSR, RSRQ, or RSSI. This may influence per-layer filtering of radio measurements for the UE.

Meanwhile, the UE may experience interference by hidden nodes. The base station may separately report interference by hidden nodes through measurement on the DRS that it sent after succeeding in LBT. The UE may report with a PCell which is a licensed band or an SCell which is an unlicensed/shared band.

As proposed herein, the base station may inform the UE whether LBT for DRS and DRS transmission succeed or fail to assist the UE in measurement.

Further, the base station may give, through the PCell or PS Cell in a cross-carrier scheme or a self-carrier scheme, information about whether DRS succeeds or fails in some DRS transmission resource position.

Further, the base station may inform whether LBT and transmission succeed or fail on a single DRS or simultaneously inform whether LBT and transmission succeed or fail on multiple DRSs in the DRS occasion.

The DRS transmission resource position may be set based on the system frame number and subframe index of the base station.

Various embodiments for the base station control methods are described.

In an embodiment, the following is a method to inform whether one DRS succeeds/fails through the PCell or PSCell. The base station performs LBT before sending one DRS.

In the case the LBT scheme is FBE, it performs CCA in the set position, and if the radio resources are empty, it performs transmission in the set DRS transmission resources. If the radio resources are occupied as a result of CCA, it abandons this chance, waits for a next DRS transmission chance, and performs CCA again. The base station informs the UE whether CCA succeeds/fails in the CCA period for the set DRS transmission resource position in the subframe next to the subframe where the DRS transmission resource position has been set. Since the PCell or PScell informs, the information that the base station provides should contain target carrier information and whether DRS succeeds/fails. The base station may previously set for the UE with the CCA success/failure setting information as to what time CCA success/failure may be informed after the DRS transmission time or what resources CCA success/failure may be informed with. The UE may control the filtering of measurements with one subframe delayed based on the CCA success/failure setting information.

In the case that the LBT scheme is LBE, a reservation signal is sent at the time when the ECCA counter becomes 0, and a DRS is sent in the preset DRS transmission resource position. The preset DRS transmission resource position may be a subframe set within a set frame (scheme 1) or any subframe within a set frame (scheme 2) depending on schemes. Unless the ECCA counter becomes 0 before the preset DRS transmission resource position, it abandons transmission in the present DRS transmission resource position and subsequently performs the operation of reducing the ECCA counter. In the case of scheme 1, the resource is being occupied in one DRS transmission resource position within the DRS frame set to transmit DRS, and thus, upon failure to send, it should be sent in the DRS transmission resource position set in the next DRS frame. In the case of scheme 2, the resource is being occupied in one DRS transmission resource position within the DRS frame set to send DRS, and thus, despite failure to send, if the remaining ECCA counter reduces to 0 within the same frame, DRS transmission may immediately begin. However, if the remaining ECCA counter fails to be 0 within the same frame, it subsequently performs ECCA operation in the next frame.

The base station informs the UE whether DRS succeeds/fails in some DRS transmission resource position in, e.g., the second subframe after the subframe where the DAS transmission resource position has been set. The base station may previously set for the UE with the CCA success/failure setting information as to what time CCA success/failure may be informed after the DRS transmission time or what resources CCA success/failure may be informed with. The UE may control the filtering of measurements with two subframes delayed based on the CCA success/failure setting information.

In the case that the LBT scheme is modified LBE, the ECCA operation may be operated so that the time when the ECCA counter becomes 0 is identical to the preset DRS transmission resource position. Or, although the ECCA counter becomes 0, it may wait without sending DRS and send in the preset DRS transmission resource position. Whether DRS succeeds/fails may be known to the UE by the base station similar to the LBE scheme.

In another embodiment, the following is a method to inform whether one DRS succeeds/fails through the S Cell. The base station performs LBT before sending one DRS. This embodiment is similar to the above-described embodiment except that, as the SCell informs, the information that the base station provides need not include target carrier information but should include whether DRS succeeds/fails.

Other embodiments are similar to the above examples. However, rather than success/failure for each DRS transmission subframe being sent out, success/failure for a plurality of DRS transmissions are simultaneously sent in one DRS occasion. The base station may previously set for the UE with the CCA success/failure setting information as to what time CCA success/failure may be informed after the last DRS transmission time in the DRS occasion or what resources CCA success/failure may be informed with. The UE may control the filtering of measurements with one subframe delayed based on the CCA success/failure setting information. The base station may inform the UE whether each of the plurality of DRS transmissions succeeds/fails in a bitmap or with the first subframe index that has failed due to channel occupancy by other system, the index of the DRS signal in the DRS occasion, or the number of subframes that have failed continuously. Informing with the subframe index may be done with some reference value or offset from the present subframe where a control signal is transmitted.

Meanwhile, possible is a method in which the base station informs the UE whether LBT succeeds/fails or DRS transmission succeeds/fails not through a control signal but in the DRS signal. Such method is free of the burden of modifying the standards over the afore-described method for the base station informing the success/failure which should add a new control signal (control channel or MAC higher layer signal) to do so. Further, in the prior case where the base station informs, the base station should inform all UEs meeting conditions of success/failure through the PCell control channel. The conditions include where among all secondary carrier components (SCCs), the SCC that transmits DRS overlaps the DMTC target carrier set for the UE on time, i.e., where in the serving carrier the DRS occasion overlaps the DMTC period or where in the non-serving carrier the DRS occasion overlaps the measurement gap. As more UEs meet the conditions, the base station should use many resources in sending such control signals. Accordingly, a need exists for a method allowing the UE to be aware whether DRS transmission succeeds/fails by only receiving DRS.

1) Bitmap method: The base station sends bitmap information about the DRS subframe in the DRS occasion in the DRS signal or in-PDSCH data signal sent together with the DRS so that the UE may be aware whether transmission succeeds/fails in each DRS subframe.

The bitmap may be sent denoted with 1 where DRS fails in the DRS subframe prior to each subframe and 0 where DRS succeeds.

FIGS. 4A to 4D are views illustrating examples of providing information about whether DRS transmission succeeds using a bitmap method. Where continuous DRSs succeed/fail/succeed in order, the bitmap representation is 00010, and where the continous DRSs all succeed, the bitmap representation is 00000. Where the continouous DRSs succeed/fail/succeed/fail/succeed (FIG. 4C0, the bitmap representation is 01010 and this is 10 in decimal system. Where the continuous DRSs succeed/fail/fail/succeed in order, the bitmap representation is 00110, and where the continuous DRSs succeed/fail/fail/succeed/succeed in order (FIG. 4B), the bitmap representation is 01100. Where the continuous DRSs succeed/succeed/fail/fail/succeed in order (FIG. 4D), the bitmap representation is 00110.

As set forth above, the bitmap scheme is precise, but suffers from increasing the amount of information necessary for representation. Accordingly, it, although sent in the DRS sequence, is preferably sent as data along with the DRS.

2) Busy counter method: Whenever LBT for DRS transmission fails, the base station counts the failures and sends the number of continuously failed DRSs for LBT through the DRS that succeeds for next LBT. This way, although unable to inform for all cases as the bitmap scheme does, may represent most of the cases.

FIGS. 5A to 5D are views illustrating examples of methods for providing information about whether DRS transmission succeeds using a busy counter.

Where all DRS transmissions succeed (FIG. 5A), there are no continuous failures. Thus, it becomes 00000. Where DRS transmissions succeed/fail/fail/succeed/succeed (FIG. 5B), the busy counter becomes 020. Where DRS transmissions succeed/fail/succeed/fail/succeed (FIG. 5C), the busy counter becomes 011. Where DRS transmissions succeed/succeed/fail/fail/succeed (FIG. 5D), the busy counter becomes 002.

By receiving the DRS transmission success/failure information, the UE may be aware when in the preset DRS time the base station has succeeded/failed in DRS transmission and perform its operations corresponding to circumstances distinguished from each other as follows. The UE may report information about distinguished circumstances to the base station, and upon reporting, the UE may add at least one of the DRS position used for measurement and per-circumstance measurements. Meanwhile, the UE may separately distinguish per-circumstance measurements, store and update the measurements.

TABLE 1

| eNB transmits DRS | UE receives DRS | Status | Corresponding UE operations |
|---|---|---|---|
| Succeed | Succeed | No collision upon LBT No hidden node | Serving cell's RSRP/RSRQ measurement and CQI reporting |

TABLE 1-continued

| eNB transmits DRS | UE receives DRS | Status | Corresponding UE operations |
|---|---|---|---|
| Succeed | fail | there is collision upon LBT there is hidden node | Serving cell's RSRP/RSRQ measurement and CQI reporting or neighbor cell's or other system's RSSI measurement and reporting |
| Fail | fail | Base station CCA failure | neighbor cell's or other system's RSSI measurement and reporting |

[Use of Different LBT Parameters for Control and Data]
1. Apply different LBT parameters upon transmitting control signals alone and upon transmitting data signals LBT parameters include at least one of CCA/ECCA slot length, CCA counter value, CWmin/CWmax, CCA threshold, COT length, length of idle period, and timing information set by the base station for reuse.

Different LBT parameters may be set for the LBT case where only control signals, e.g., DRS, are sent and for the LBT case where data signals are sent together.

For example, in the FBE case where only control signals are sent, the CCA period may be set to be shorter. In the LBE case, the CWmax (maximum CW value) of ECCA may be set as a small value, e.g., to be identical to the CWmin (minimum CW value).

FIGS. 6A to 6F are views illustrating examples of setting LBT parameters for the LBT case where only control signals, such as DRS, are transmitted to be different from LBT parameters for the LBT case where data signals along with control signals are transmitted, according to an embodiment of the present disclosure.

(Scheme 1) According to the present embodiment of the present disclosure, the base station may temporally separate and use LBT parameters for sending only control signals and LBT parameters for sending data signals as well.

For example, during the period when data transmission is not performed, i.e., such as a DRS occasion when a control signal, such as DRS, is transmitted, operations are performed as LBT parameter set 1 for only control signals, such as DRS. LBT parameters for only control signals to reduce the load on the UE's reception may be set by the base station for the UE. The base station may change its operation to LBT parameter set 2 to send data. If there is no further data to send, the base station may change the operation to LBT parameter set 1.

Figure 6A:
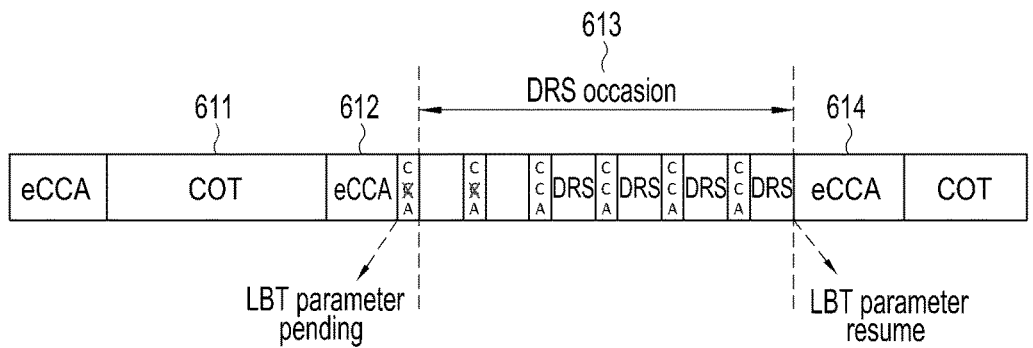
FIGS. 6A to 6F are views illustrating examples of setting LBT parameters for the LBT case where only control signals, such as DRS, are transmitted to be different from LBT parameters for the LBT case where data signals along with control signals are transmitted, according to an embodiment of the present disclosure.

Referring to FIG. 6A, the base station is operated in LBT parameter set 2 and secures a channel to send data. After sending during a COT period 611 and where the base station fails to secure a channel due to ECCA (612) failure for a predetermined time although there is data to send, the base station may change to LBT parameter set 1 for DRS transmission in the periodic DRS occasion 613. If the DRS occasion 613 ends, the base station may change back to LBT parameter set 2 and operate. At this time, as some parameters among LBT operations resumed as per LBT parameter set 2, values stored before changing to LBT parameter set 1 may proceed.

For example, after the backoff counter value reduces from 24 to 10 as the ECCA operation 613 for data is performed, and if it changes to LBT parameter set 2 for DRS transmission in the DRS occasion 615 and a new ECCA starts, then the previous backoff counter value 10 is stored. The DRS occasion 615 ends, and the backoff counter value, 10, stored to resume the ECCA operation 616 for data is called in and begins.

Figure 14:
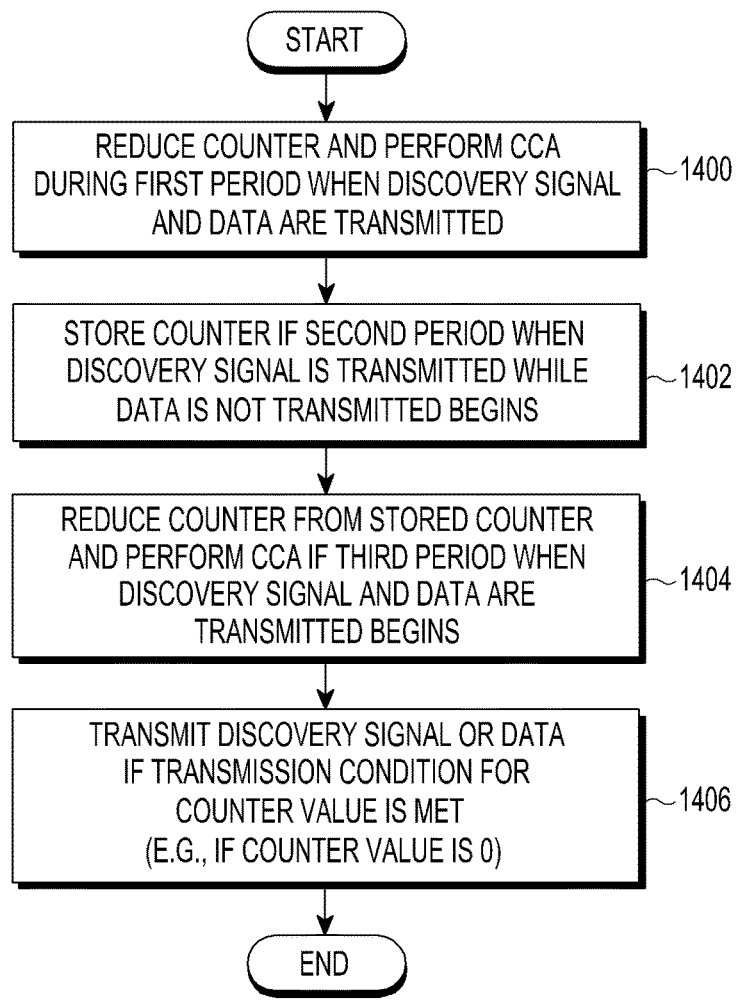
FIG. 14 is a flowchart illustrating the operations of FIG. 6A.

FIG. 14 is a flowchart illustrating the operations of FIG. 6A.

In a first step 1400, the counter reduces during a first period when a UE discovery signal and data are transmitted, and channel clear assessment (CCA) is carried out.

In a second step 1402, if a second period when only discovery signals are transmitted without data begins, the counter is stored.

In a third step 1404, if a third period when a discovery signal and data are transmitted begins, the counter reduces from the stored counter and CCA is performed.

In a fourth step 1406, if a transmission condition for the counter value is met (e.g., if the counter value becomes 0), a discovery signal or data is transmitted.

A look at the flowchart reveals that the counter reduced in the first step passes through the second period and is stored in the third period, and CCA is performed using the stored counter. Thus, it is more advantageous from a time perspective in relation with channel access and data transmission than when the counter is reset.

Figure 6B:
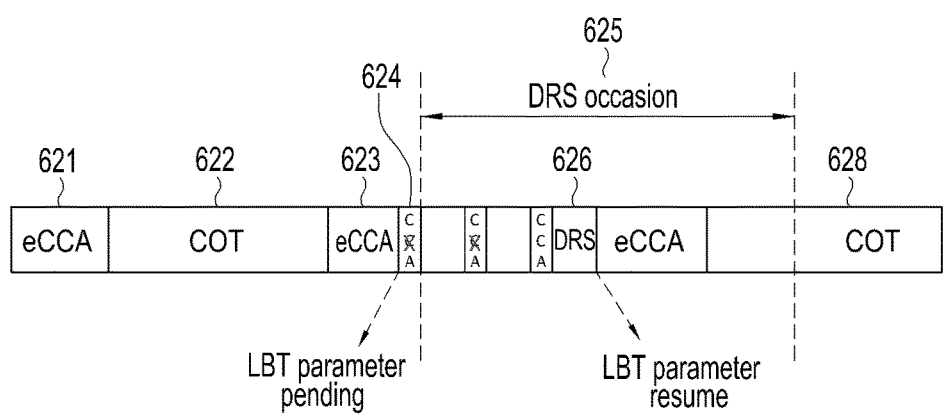

In another embodiment, referring to FIG. 6B, the base station uses the FBE scheme in which sensing is performed with one CCA to send only DRS and uses the LBE scheme that is based on contention window size (CWS) and backoff counter for data transmission. The base station, if arriving at the DRS transmission period 625 although failing to secure resources as the backoff counter does not reach 0 yet, changes to the FBE scheme and performs sensing, and during the period, the base station maintains the backoff counter value as it is. After CCA sensing succeeds (i.e., the channel being empty is identified) and thus a DRS is sent, the base station, rather than generating a new backoff counter value, resumes the LBE-scheme sensing and the operation of reducing the backoff counter from the backoff counter value previously left. This embodiment makes a difference in configuration from the prior embodiment in that where DRS transmission ends without filling the DRS occasion period 625, data is transmitted after changing to parameter set 2 and performing ECCA 627 even within the DRS occasion period 625.

Figure 6C:
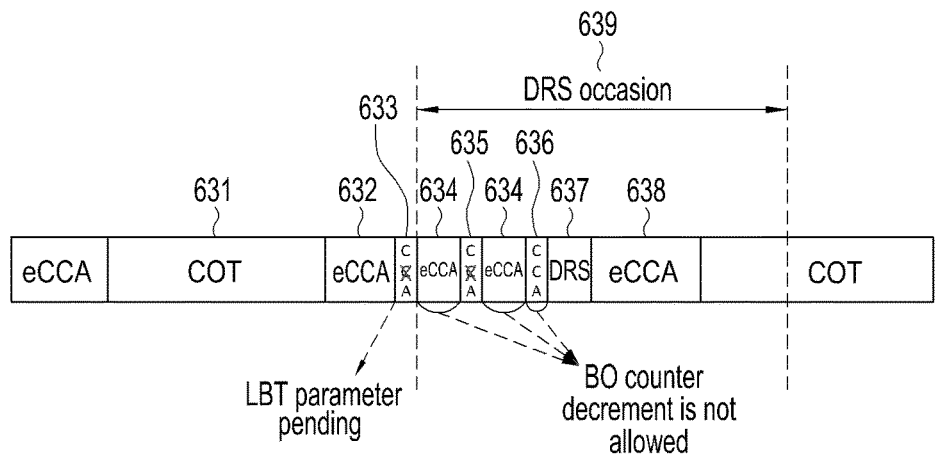

In another embodiment, referring to FIG. 6C, the base station uses the aggressive LBE scheme which enables a higher chance to secure channel to transmit only DRSs and uses the normal LBE scheme which presents a normal success rate in securing channel to transmit data. Although the backoff counter does not reach 0 yet, and thus the base station fails to secure resources, once the base station arrives at the DRS transmission period 639, the base station changes to the aggressive LBE scheme, performs sensing (eCCA) using a new backoff counter (BO counter) generated with a small CWS, and maintains the backoff counter value for the normal LBE for data transmission during the eCCA period 634. Meanwhile, after the counter is used up and thus becomes 0 as a result of sensing during the eCCA period for DRS transmission, and a DRS is transmitted 637, the base station does not generate a new backoff counter value and resumes the normal LBE-scheme sensing and backoff counter reduction operation 638 from the backoff counter previously maintained.

Figure 6D:
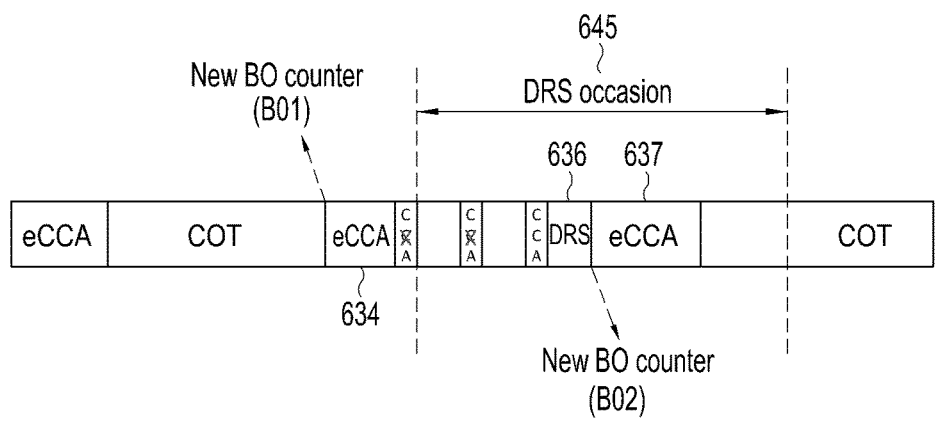

In still another embodiment, referring to FIG. 6D, the base station may set different LBT parameter sets for LBT operations for transmitting data with different-priority traffic grades. Accordingly, the base station may separately operate a backoff counter value BO1 used in an eCCA period operation LBT1 for sending traffic grade 1 and a backoff counter value BO2 used in an eCCA period operation LBT2 for sending traffic grade 2. However, not all of the backoff counter values for the plurality of traffic grades are not reduced as a result of one-time sensing, but rather, corresponding backoff counter values alone are reduced in per-traffic grade LBT operations. In other words, if the channel is empty as a result of channel sensing during the LBT1 operation, the first backoff counter BO1 is reduced, while the backoff counter BO values for other traffic grades including the second backoff counter BO2 remain as they are. A switch is made from the LBT1 operation to the LBT2 operation. Likewise, upon sensing that the channel is empty, the BO2 value is reduced while the backoff counter BO values for other traffic grades including the BO1 value remain as they are. When resuming the LBT operation for a particular traffic grade, the base station performs the backoff counter reduction operation from the corresponding BO value that it maintains.

In another embodiment, the base station may operate separate BOs for an LBT procedure LBT40 for a 40 MHz channel and for LBT procedures LBT20_1 and LBT20_2 for two 20 MHz channels split from the 40 MHz channel. In other words, the base station controls the BO40 value by the LBT40 operation and controls the BO20_1 and BO20_2 values by LBT20_1 and LBT20_2, respectively. The base station reduces the BO40 value as a result of sensing the 40 MH channel while maintaining the BO20_1 and BO20_2 values as they are. Further, as a result of sensing the 20 MH channel 1 or channel 2, the base station reduces the BO20_1 or BO20_2 value while maintaining the BO40 value as it is. When resuming the LBT operation for a particular bandwidth, the base station performs the backoff counter reducing operation as per sensing from the corresponding bandwidth and per-channel BO value that it maintains.

As compared with the scheme (scheme 1) of temporally separating a plurality of LBT procedures following a plurality of LBT parameter sets and maintaining LBT parameters when they are not used, two schemes may be possible as follows.

(Scheme 2) Referring to FIG. 6D, this scheme is to temporally split a plurality of LBT procedures, and on top of that, generate new LBT parameters to switch into a particular LBT procedure. The base station uses the FBE scheme which performs sensing with one CCA to send DRSs only and uses the LBE scheme that is based on the backoff counter and CWS to send data. The base station, if arriving at the DRS transmission period (DRS occasion) 645 although failing to secure resources as the backoff counter does not reach 0 yet, may change to the FBE scheme and perform sensing, and the base station may discard the prior backoff counter value during this period. After CCA sensing succeeds (i.e., the channel being empty is identified) and thus a DRS 636 is sent, the base station generates a new backoff counter value and initiates an LBE-scheme sensing and backoff counter reduction operation.

Figure 6E:
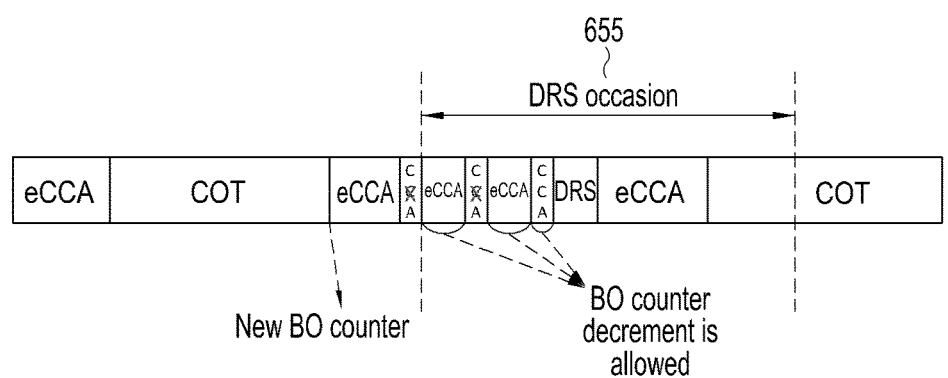

(Scheme 3) Referring to FIG. 6E, this scheme is to impose a restriction on LBT parameters while simultaneously performing a plurality of LBT procedures. The base station uses the FBE scheme which performs sensing with one CCA to send only DRSs and uses the LBE scheme which is based on the CWS and backoff counter (BO) to send data. The base station, if arriving at the DRS transmission period (DRS occasion) 635 although failing to secure resources as the backoff counter does not reach 0 yet, adds the FBE scheme to perform sensing, and the base station may reduce the backoff counter as to a result of sensing during this period.

Figure 6F:
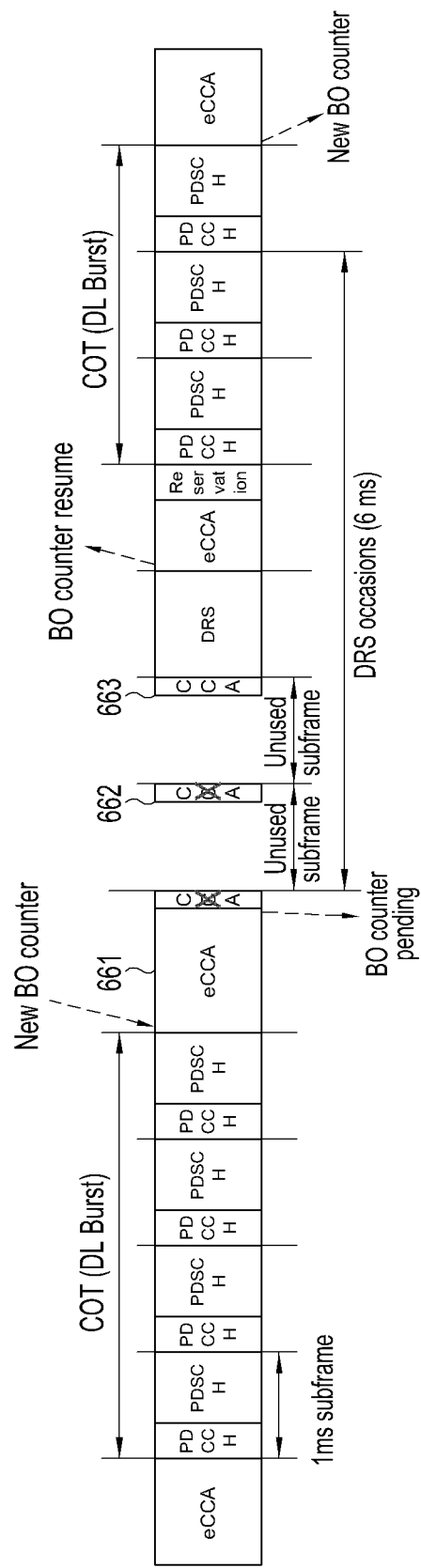
Figure 7:
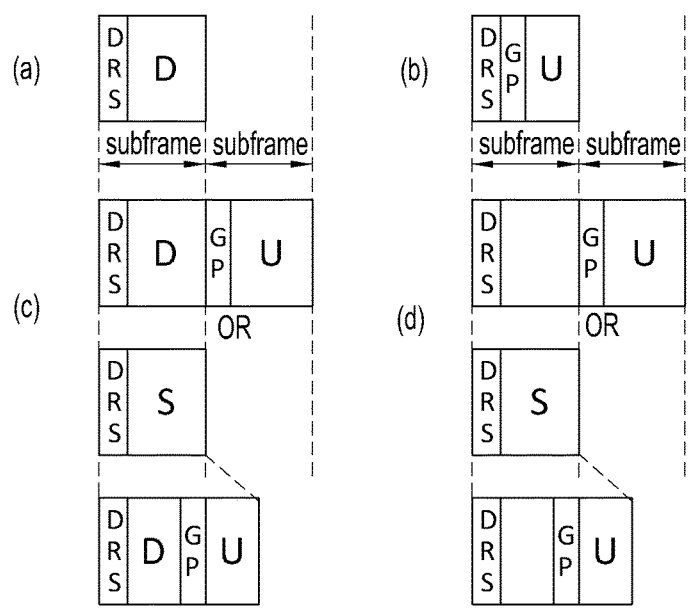
FIGS. 7A to 7D are views illustrating a method for allocating a downlink or uplink to a subframe for DRS transmission according to an embodiment of the present disclosure.

(Scheme 4) Referring to FIG. 6F, according to another embodiment, the base station uses the FBE scheme which performs sensing with one CCA to send only DRSs and uses the LBE scheme which is based on the CWS and backoff counter to send data. The base station, if arriving at the DRS transmission period although failing to secure resources as the backoff counter does not reach 0 yet, changes to the FBE scheme and performs sensing during the CCA period (e.g., 25 µs), and the base station maintains the backoff counter value as it is during the CCA period. Meanwhile, if as a result of sensing during the CCA period, the channel is being used (i.e., "busy channel"), the 1 ms DRS transmission period is rendered to pass without being used or sensed, and accordingly, the backoff counter value is maintained as it is. After CCA sensing succeeds (i.e., the channel being empty is identified) and thus a DRS is sent, the base station, rather than generating a new backoff counter value, resumes the LBE-scheme sensing and the operation of reducing the backoff counter from the backoff counter value previously left.

Meanwhile, where the sensing results are not shared in the CCA and eCCA depending on a particular implementation, the reduction in backoff counter is possible only in periods which are not the CCA period. After CCA sensing succeeds (i.e., the channel being empty is identified) and thus a DRS is sent, the base station continues the LBE-scheme sensing and backoff counter reduction operation based on the backoff counter value that is being used.

[DRS+DL/DRS+UL/DRS+DL+UL]

FIGS. 7A to 7D are views illustrating a method for allocating a downlink or uplink to a subframe for DRS transmission according to an embodiment of the present disclosure.

As shown in FIG. 7A, the method for allocating uplink or uplink to the subframe for DRS transmission according to an embodiment of the present disclosure may send a DRS in a set resource position when the base station does not transmit data. Meanwhile, although data transmission for individual UEs is not performed, a relatively short downlink period (U) or uplink period (D) may be required for the base station to transmit a broadcast message or to receive a report or feedback message from the UE. To support this, the base station may send broadcast (BCH/MCH) or downlink shared channel (DL-SCH) messages to all or individual UEs through the downlink D resources (PDCCH or PDSCH) in the subframes where the DRSs are sent.

As shown in FIG. 7B, according to another embodiment of the present disclosure, the base station may send random access (RACH) or uplink shared channel (UL-SCH) messages through uplink U resources (PRACH, PUCCH, or PUSCH) in subframes where the DRSs are transmitted.

As shown in FIG. 7C, according to another embodiment of the present disclosure, where the subframes where DRSs are transmitted are configured only in the downlink, such a method may also be present that a downlink resource D is allocated in the subframe where the DRS is transmitted, and an uplink resource U is allocated in the next, subsequent subframe or a special subframe is allocated in the subframe where the DRS is sent.

As shown in FIG. 7D, according to another embodiment of the present disclosure, there may be a method in which without allocating a downlink resource in the subframe where the DRS is sent, an uplink resource is allocated in the next, subsequent subframe or a special subframe is allocated in the subframe where the DRS is transmitted with no downlink resource allocated in the special subframe.

Where an uplink is allocated in the next subframe subsequent to the DRS subframe, if DRS s are transmitted in continuous subframes, it may apply to the last DRS subframe and its next subframe.

The base station may use a predetermined one of the various methods described above. Or, if a dynamic variation is possible among the plurality of methods, it may be set for the UE with a broadcast message. Meanwhile, the UE, upon receiving a DRS, has difficulty in being aware whether the period is a COT period when the base station has secured the channel for data transmission or others. Thus, the base station may send an indicator to distinguish them in the DRS or a downlink signal that is sent together with the DRS.

The UE may receive the DRS and/or downlink signal to discern whether it is within the COT period or not. By such distinction, at least one of the UE's measurement, appreciation of the frame structure, synchronization, and data transmission/reception may be performed differently.

The UE may receive the DRS and/or downlink signal to discern whether it is within the COT period or not. By such distinction, at least one of the UE's measurement, appreciation of the frame structure, synchronization, and data transmission/reception may be performed differently.

According to an embodiment, where the UE receives COT (DL+UL) length information through the PDCCH common DCI, the UE uses FBE-scheme LBT if it is in-COT UL signal transmission and LBE-type LBT if it is outside-COT UL signal transmission.

According to another embodiment, where the UE receives information about the offset (e.g., the number of remaining subframes) to the last subframe of the COT through the PDCCH common DCI, the UE uses the FBE-type LBT if it is in-COT UL signal transmission and LBE-type LBT if it is outside-MCOT UL signal transmission.

According to an embodiment, where the UE receives COT (DL+UL) length information through the PDCCH common DCI, the UE uses FBE-scheme LBT if it is in-COT UL signal transmission and LBE-type LBT if it is outside-COT UL signal transmission.

According to another embodiment, where the UE receives information about the offset (e.g., the number of remaining subframes) to the last subframe of the COT through the PDCCH common DCI, the UE uses the FBE-type LBT if it is in-COT UL signal transmission and LBE-type LBT if it is outside-COT UL signal transmission.

[Multicarrier Transmission Method]

1. Method for Providing Channel Priority for Signal Measurement in Different Frequency in LAA The present disclosure defines operations that the UE performs during a measurement gap in an LTE system, i.e., LAA, using an unlicensed band.

Figure 8A:
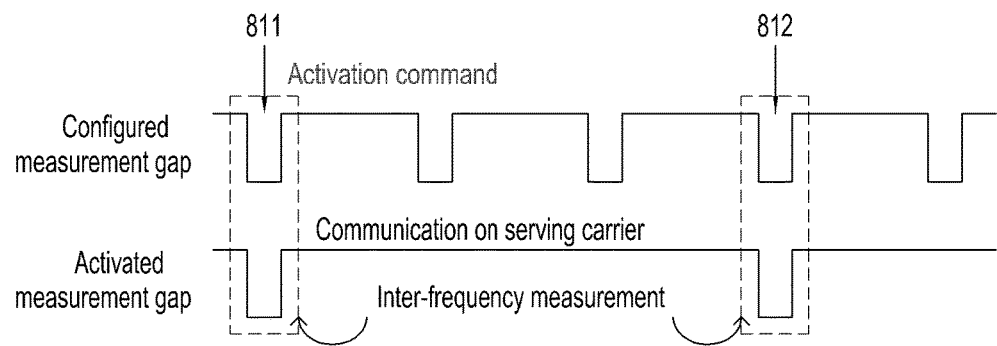
FIG. 8A is a view illustrating a method for providing a channel priority for inter-frequency measurement according to the conventional art.
Figure 8B:
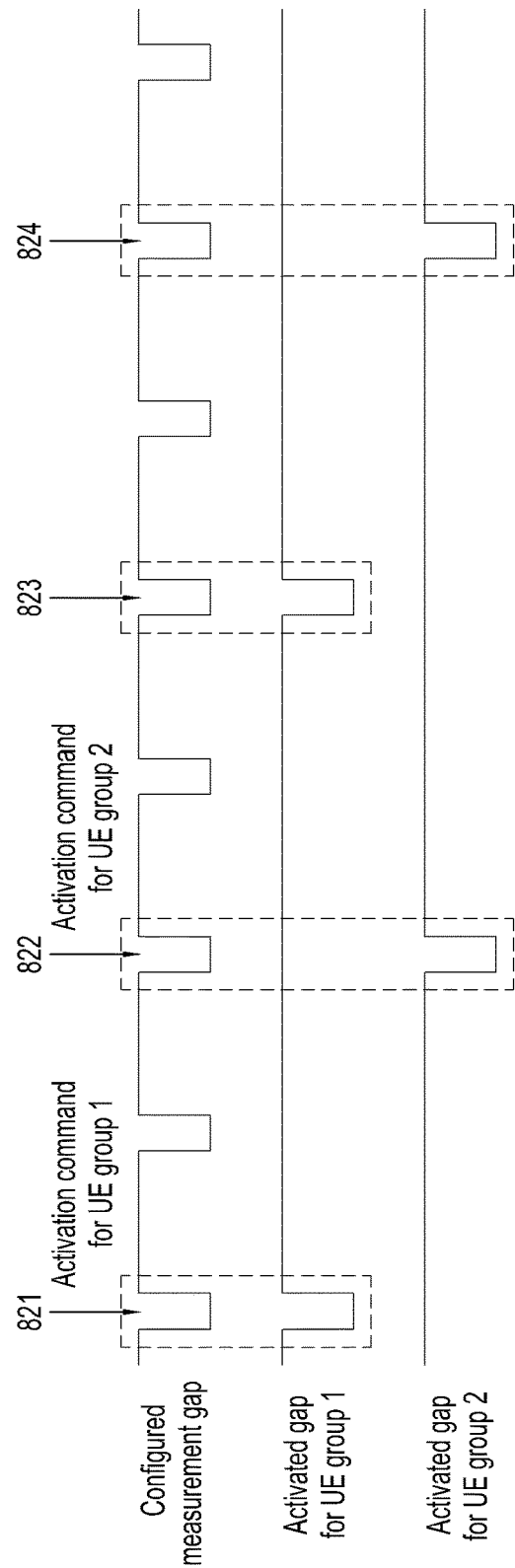
FIG. 8B is a view illustrating a method for providing a channel priority for inter-frequency measurement according to an embodiment of the present disclosure.

FIG. 8A is a view illustrating a method for providing channel priority for signal measurement in a different frequency according to the conventional art. FIG. 8B is a view illustrating a method for providing channel priority for signal measurement in a different frequency according to an embodiment of the present disclosure.

As shown in FIG. 8A, as per Applicant's existing LAA-related patents, the base station first sets a measurement gap for the UE as do legacy LTE operations and should inform the UE whether to perform inter-frequency measurement or allow the serving carrier to receive data instead of inter-frequency measurement during the measurement depending on whether the unlicensed band is occupied.

Accordingly, upon receiving an activation command 811 from the base station immediately before the measurement gap, the UE performs inter-frequency measurement during the measurement gap, and if it does not receive the same, the UE transmits/receives data on the serving carrier while maintaining the RF in the current serving carrier during the measurement gap. Here, allocating a measurement gap to the UE may take the following forms.

There may be a method for setting a common measurement gap for all UEs in the base station and a method for independently setting measurement gaps for all UEs in the base station.

A common measurement gap is set for multiple UEs included in a particular UE group in the base station, and independent measurement gaps are set for multiple UEs included in different UE groups.

There may be another possible way in which a common measurement gap is set for all the UEs in one base station, and whether to perform inter-frequency measurement is known to each UE group during the actual measurement gap due to transmission/reception of an activation command. Such operations are shown in the following figures.

FIG. 8B is a view illustrating operations when a common measurement gap is applied to each group of UEs according to an embodiment of the present disclosure.

As shown in FIG. 8B, all the UEs have a measurement gap as represented "configured measurement gap." UE group 1 consisting of multiple UEs, upon receiving activation commands 821 and 823 denoted in red, perform inter-frequency measurement during the measurement gaps when the commands are received. Likewise, UE group 2 consisting of multiple UEs, upon receiving activation commands 822 and 824 denoted in blue, perform inter-frequency measurement during the measurement gaps when the commands are received.

Further, the base station may transmit the following additional information along with the activation command when sending the activation command.

Example 1: Channel (frequency) ID requiring inter-frequency measurement

Example 2: Channel (frequency) ID requiring inter-frequency measurement and whether the current serving base station performs signal transmission/reception according to success in LBT on each channel Further, the base station may transmit the following additional information along with the activation command when sending the activation command.

Example 1: Channel (frequency) ID requiring inter-frequency measurement

Figure 9A:
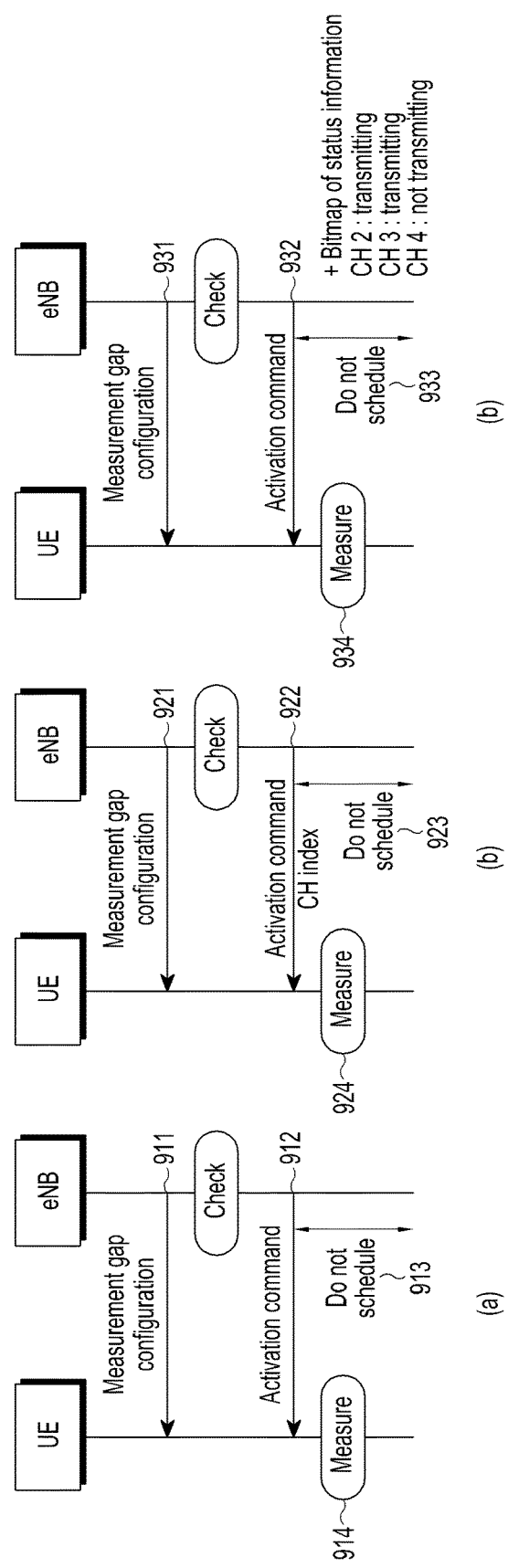
FIGS. 9A and 9B are views illustrating a method for setting information about a plurality of carriers according to the conventional art.
Figure 9B:
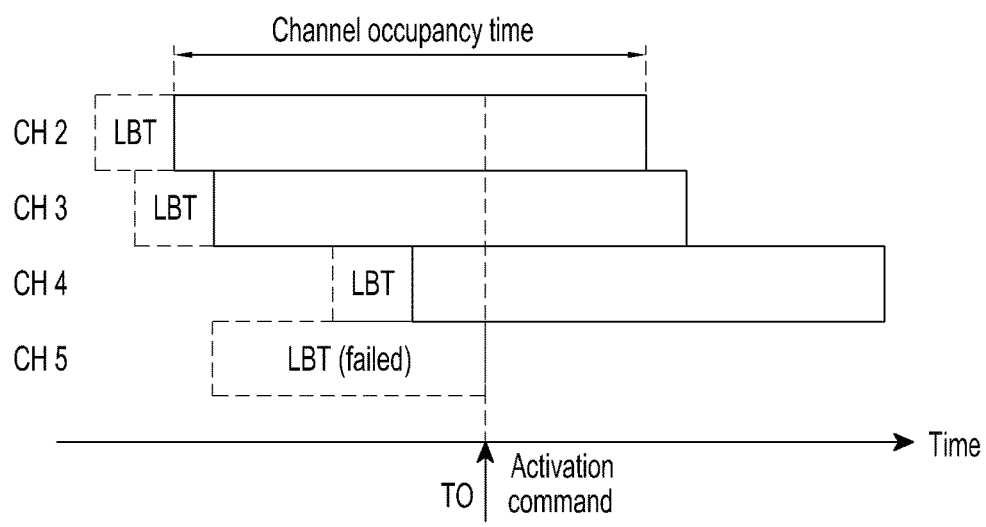

Example 2 Channel (frequency) ID requiring inter-frequency measurement and whether the current serving base station performs signal transmission according to success in LBT on each channel FIGS. 9A and 9B are views illustrating a method for setting information about a plurality of carriers according to the conventional art.

As shown in FIG. 9b, the UE according to embodiment 1 measures all or some channels among channel IDs known by the base station. Further, as shown in FIG. 9c, according to embodiment 2, the UE first measures channels CH2 and CH3 where signals are currently being transmitted among the channel IDs known by the base station, and the UE measures CH4 which is a channel where no signal is now being transmitted after measuring all the channels where signals are now being transmitted or does not measure CH4.

As another relevant method, the base station may transmit the following additional information along with the activation command when sending the activation command.

Embodiment 3: Channel (frequency) ID requiring inter-frequency measurement and priority information about UE's performing measurement According to embodiment 3, the UE sequentially measures channels corresponding to the channel IDs known by the base station according to the priorities known by the base station. Here, the priorities may be determined according to the following elements.

(1) A channel that is performing signal transmission according to success in LBT at the time that an activation command is transmitted has a higher priority than a channel that is not performing signal transmission due to LBT failure.

(2) The shorter remaining channel occupancy time each channel has at the time that the base station transmits the activation command, the higher priority the channel has.

(3) The lower long-term average load each channel has at the time that the base station transmits the activation command, the higher priority the channel has.

FIG. 9B shows a situation where the base station transmits an activation command to the UE at T0. At T0, the base station performs transmission on CH 2, CH 3, and CH 4 but is not occupying CH 5. Accordingly, CH 2, CH 3, and CH 4 have higher priorities than CH 5. If the priority is determined based on the remaining channel occupancy time, the priority is assigned in the order of CH 2, CH 3, and CH 4.

Resultantly, the priority is assigned in the order of CH 2, CH 3, CH 4, and CH 5, and the base station informs the UE of the priorities. Upon receiving the priorities, the UE performs inter-frequency measurement in the order of CH 2, CH 3, CH 4, and CH 5.

The order in which the UE performs inter-frequency measurement within the measurement gap in legacy LTE is not known by signaling between the base station and the UE. This is why CRSs or so are always transmitted periodically because LTE operates on licensed bands. However, since LAA operates on unlicensed bands, the UE is currently experiencing the busy state, and thus, the base station is less required to measure channels where no transmission is performed. Accordingly, the base station provides priority information about inter-frequency measurement to the UE to allow the UE to measure earlier channels with higher measurement effectiveness.

The above example considers the situation where an activation command and priority information are sent together. The present disclosure may operate under the same principle even where priority information alone is transmitted with no activation command transmitted. In other words, where there is no activation command, inter-frequency measurement is performed in all measurement gaps set for all UEs, and priority information is utilized in the same manner as has been described above.

2. Channel Group-Based Channel Switching in LAA

As per Applicant's existing patents, the base station inserts a defer period into a predetermined common transmission timing to end LBT or varies the LBT start time when performing the LBT. According to the present disclosure, there is proposed a method for performing channel switching in each channel group when such existing patents apply.

Figure 10:
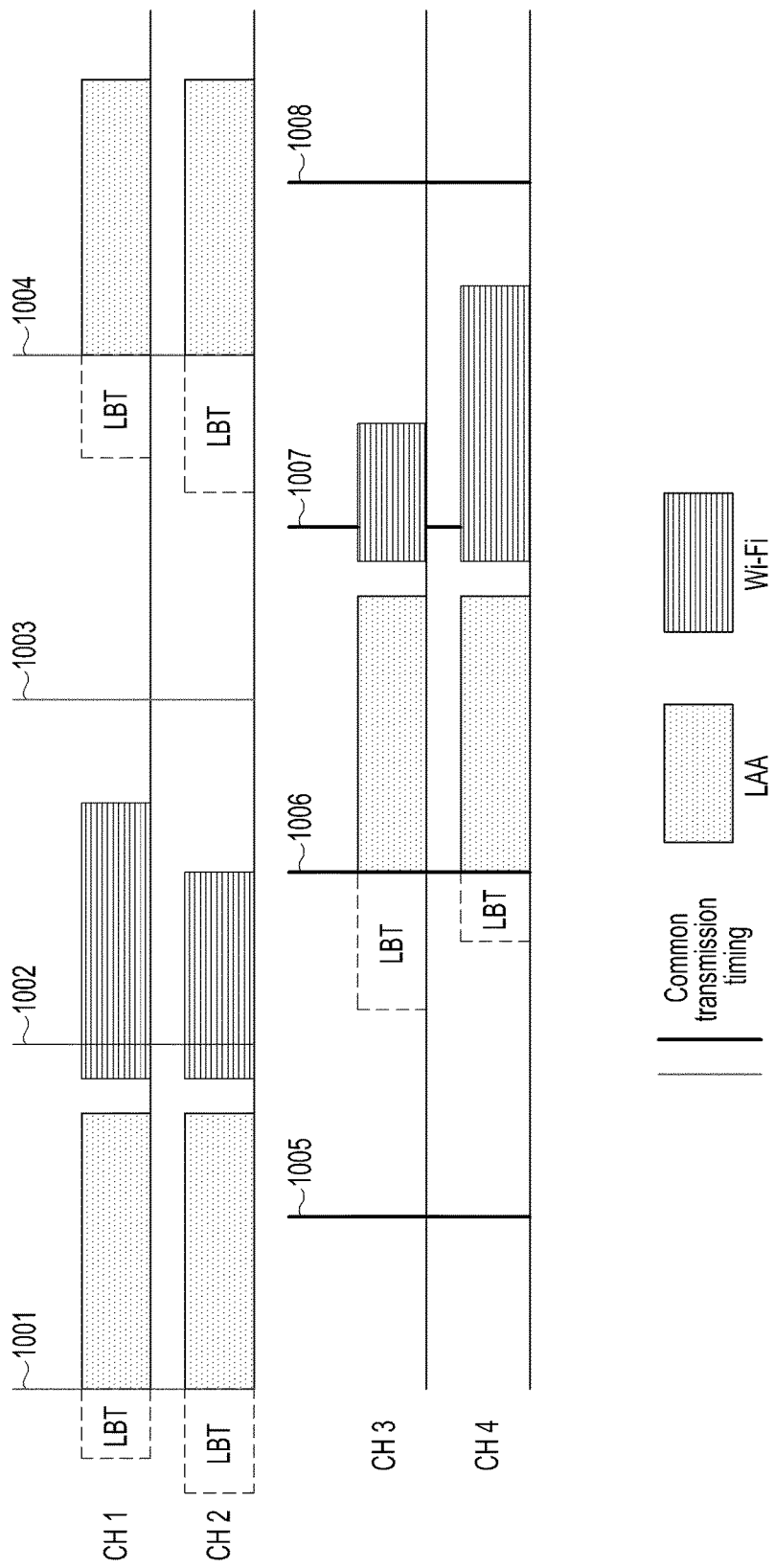
FIG. 10 is a view illustrating an example of switching channel groups.

FIG. 10 is a view illustrating an example of switching channel groups.

As shown in FIG. 10, when CH 1 and CH 2 form one channel group, and CH 3 and CH 4 form one channel group, switching occurs between the channel groups.

The base station forms CH 1 and CH 2 into one channel group.

The base station forms CH 3 and CH 4 into one channel group.

The base station sets an independent common transmission timing for each channel group. That is, although the channels belonging to the same channel group have the same common transmission timing, common transmission timings are independently allocated among different channel groups.

The base station performs LBT per channel when data to be transmitted arises, and in this case, the base station allows the end times to be the same as the common transmission timing when LBT succeeds according to Applicant's existing patents (in the self-deferring operation).

If the base station fails in LBT for CH 1 and CH 2 due to, e.g., channel occupancy by Wi-Fi, the base station should wait until the next common transmission timing 1004 as per Applicant's existing patents. However, since the common transmission timing 1006 for CH 3 and CH 4 comes along before that happens, the base station switches from CH 1 an CH 2 to CH 3 and CH 4 and performs LBT.

If the base station obtains a channel by successfully performing LBT after switching from CH 1 and CH 2 to CH 3 and CH 4, the base station performs transmission/reception with the UE through CH 3 and CH 4.

Here, the base station should inform the UE that it switches from CH 1 and CH 2 over to CH 3 and CH 4 to perform LBT. The base station informs the UE through the PDCCH of the PCell which operates on the licensed band.

If the base station fails in LBT for CH 3 and CH 4 due to, e.g., channel occupancy by Wi-Fi, the base station should wait until the next common transmission timing 1008 by performing the self-deferring operation. However, since the common transmission timing 1004 for CH 1 and CH 2 comes along before that happens, the base station switches from CH 3 an CH 4 to CH 1 and CH 2 and performs LBT. If the base station obtains a channel by successfully performing LBT after switching from CH 3 and CH 4 to CH 1 and CH 2, the base station performs transmission/reception with the UE through CH 1 and CH 2. In the above example, the description assumes that CH 1 and CH 2 form one channel group, and CH 3 and CH 4 form one channel group. The present disclosure may apply in the same manner to all the scenarios where a channel group consists of one or more channels.

[Example of Applying DRS+PLMN ID, Case of Inter-Operator Spectrum Sharing]

When transmitting a DRS+SIB, the base station may include a public land mobile network (PLMN) ID in the system information block (SIB). If a neighbor base station receives the DRS+SIB of the base station, it is possible to identify which PLMN the base station belongs to. PLMN, i.e., an agreement has previously been made between operators, and what ratio resources are to be used in may be set.

For example, when a base station, alone, belonging to PLMN1 (operator1) uses, each 9 ms is used for the length of the COT period in the LBT operation. However, if a signal of PLMN2 (operator2) is detected, the length of the COT period may be reduced to 3 ms as per the agreement.

Likewise, when a base station, alone, belonging to PLMN2 (operator2) uses, each 9 ms is used for the length of the COT period in the LBT operation. However, if a signal of PLMN2 (operator2) is detected, the length of the COT period may be reduced to 6 ms as per the agreement.

All the resources may be used in the ratio of PLMN1:PLMN2=1:2 by such resource sharing method. Additionally, since the mutual COT period is previously known, the LBT operation may be performed only when the COT end time approaches, saving power consumption of the base station and UE.

Although the COT period is not controlled between different operators' base stations, different LBT parameters may be used according to an agreement previously made. For example, CWmin and CWmax may be controlled different from each other.

For the base station belonging to PLMN1, CWmax is controlled to be 16, and for the base station belonging to PLMN2, CWmax is controlled to be 8, allowing the base station belonging to PLMN2 to have a chance of securing two times as many resources as the base station belonging to PLMN2 does.

As a condition to trigger to increase q in existing wireless LAN system, as described above, is when the transmitting device does not receive an acknowledgment for a signal that the receiving device has sent for a predetermined time, i.e., when it recognizes a negative ACK (NACK) situation. It should be noted that the ACK/NACK for wireless LAN is one for an automatic repeat-request (ARQ) process. For cellular communication, ARQ is operated on the radio link control (RLC) layer, and hybrid ARQ (HARQ) is operated on the medium access control (MAC) layer. To determine an ACK/NACK for ARQ on the RLC layer, it may be known by restoring the RLC PDU which is a combination of MAC protocol data units (PDUs) transmitted several times from the MAC layer in the receiving device. However, the transmitting device needs a long delay time until receiving an NACK report on the ARQ layer and determining as a condition to trigger for q based on the same, and it is difficult to obtain an exact reaction to a collision in the LBT operation. Accordingly, in an embodiment of the present disclosure, the case of receiving NACK feedback is received from the receiving device for each HARQ transmission, the case of receiving Nth NACK feedback predetermined is received, or the case where NACK feedback is received even after retransmission has been performed as many as the maximum number of times may be set as a triggering condition to replace ARQ in light of the receiving device.

Meanwhile, where one ECCA is performed in OFDMA-based cellular system to identify that the corresponding channel is idle and a plurality of UEs are allocated, it is vague to determine references for determination of a triggering condition in light of the receiving device. For example, it is assumed that 10 UEs are allocated to downlink subframes, and a reception failure occurs in only one of the UEs. Then, the failed UE would report NACK feedback. Accordingly, such procedure should be determined as to whether the base station is to increase q immediately or only when the UE having reported the NACK feedback transmits.

For example, assume the case where among N UEs M UEs report NACK feedback or where NACK feedback is reported for M HARQ transmissions among N HARQ transmissions. In this case, according to an embodiment of the present disclosure, various triggering conditions may be set for increasing q. Some examples are as follows: a) Trigger where M>0, b) M>N*C(0<C<1), c)(N−M)*i+M*(1−i)>N*C(0<C<1), d) trigger where M==N.

According to an embodiment of the present disclosure, if X % (i.e., where C=X/100 in the condition b) above) of the HARQ ACK feedback for the first DL subframe of the downlink (DL) burst sent from the base station is NACK, this may meet the triggering condition to increase q.

[Scheme to Adjust CWS]

A. Collision Report or NACK for Control Channel

[Adjust CW Only for Error in Control Channel]

Since the UE cannot discern detection failures in dedicated control channels, it cannot be used. It may be used for collision detection purposes only for a detection failure in the common control channel where the transmission position has previously been set. The common control channel applies where SIB is sent through existing physical broadcast channel (PBCH) or PDCCH or applies to a separate signal newly added. The separate signal may be in a particular position within the PDCCH.

The UE may feed back an error in detection of a reference signal of which the position has been set. For example, where a DRS is sent in the COT, whether to send the DRS is certain. Thus, it is possible to increase the CW size where it fails to detect the same. Besides DRS, CSI-RS, PRS, or initial/reservation signal may be used.

B. Introduce a Blank Slot in the Initial Signal

A blank slot is configured by emptying some in N symbol periods after sending an initial signal from each base station, and the same blank slot position is set for base stations in the cell group. The base station performs Tx-Rx conversion and CCA during the blank slot. The base stations in the cell group cannot detect each other as a result of CCA, and thus, the CW size is not increased. Meanwhile, if a collision occurs with other system, e.g., wireless LAN, other cell group, or other operator's base station, the CW size may be increased according to a result of CCA.

C. Method of Combining ACK/NACK Feedback for Initial Signal and Data

Increase CW size only where collision detection in the initial signal & ACK/NACK feedback is NACK D. Based on the ACK/NACK Result for the First Subframe in COT.

Where it is hard to detect a collision by the initial signal or control signal, an alternative is to deem when the NACK for data reception in the first subframe in the COT as a collision. This is why the first subframe in the COT is data transmission closest to the time when a channel is secured. By such method, the first subframe would be allocated even for different transmitting devices, e.g., where base stations have different traffic loads, and thus, a collision circumstance can exactly be measured. Further, this method determines a collision only with data channel without determining a collision with control channel in the environment where the error probability upon control channel collision is not the same as the error probability upon data channel collision, thus allowing for a more accurate determination.

Figure 11A:
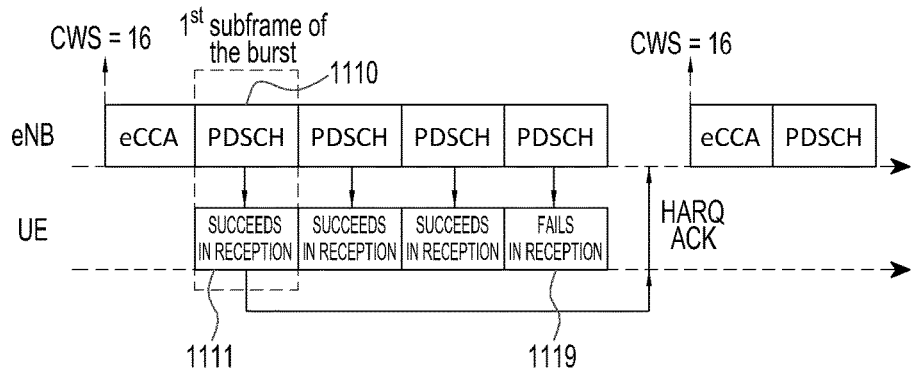
FIGS. 11A and 11B are views illustrating a method for increasing the CW size according to a result of an HARQ NACK response by a single UE.
Figure 11B:
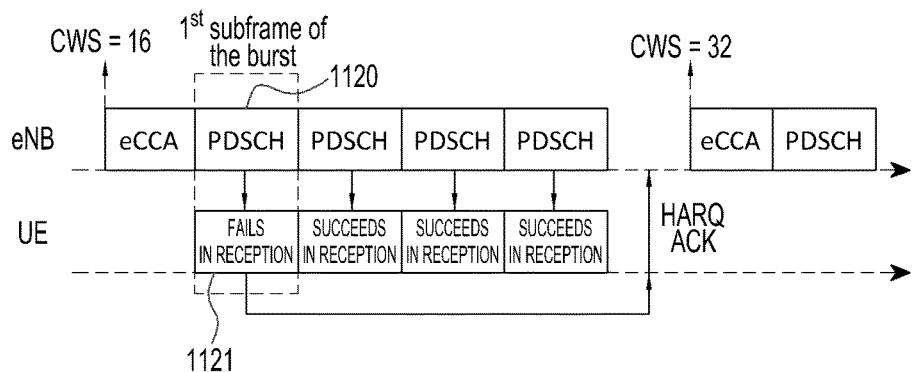
Figure 12A:
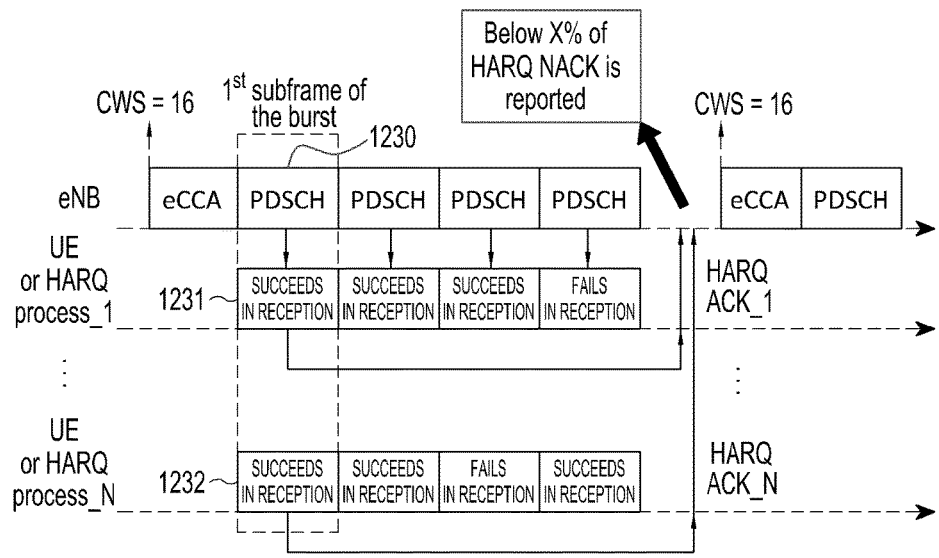
FIGS. 12A and 12B are views illustrating a method for increasing the CW size according to a result of HARQ NACK responses by multiple UEs.
Figure 12B:
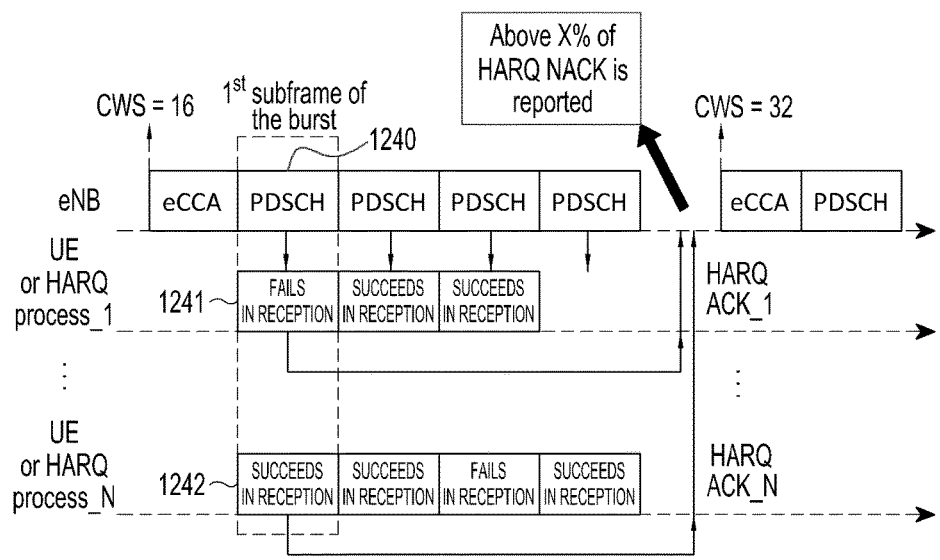

FIGS. 11a and 11b are views illustrating a method for increasing the CW size according to an HARQ NACK result. In particular, FIGS. 11a and 11b show the relationship between one base station and one UE. However, as shown in FIGS. 11A and 11B, according to an example of a method for increasing the CW size as per a result of HARQ NACK of the first subframe, the base station determines the size of the next CW based on the HARQ-ACK report for the transport block transmitted in the first subframe of the DL data burst that has been transmitted during the COT secured after the LBT has succeeded.

For example, as shown in FIG. 11A, since the reception of the first DL data has succeeded, the CW value does not increase from 16. Further, as shown in FIG. 11B, the CWS value increases from 16 to 32 due to the failure to receive the first PDSCH. Further, as shown in FIG. 11C, UE1 and UE2 both succeed in data reception in the first subframe, and thus, the CWS does not increase. However, as shown in FIG. 11D, UE1 fails to receive data in the first subframe, and thus, the CWS size increases from 16 to 32.

That is, upon informing that the HARQ ACK report of X % or more of the HARQ-ACK report for the transport block transmitted in the first subframe is NACK, it is determined that a collision has occurred when sending the DL data burst.

As per another example of a method for increasing the CW size according to a result of HARQ NACK of the first subframe, the base station determines the size of the next CW based on the HARQ-ACK report for the transport block transmitted in the first subframe of every channel transmitted of the DL data burst transmitted during the COT secured in the primary channel and secondary channel as it succeeds FBE-scheme LBT on at least one or more secondary channels along with success in the LBE-scheme LBT on one primary channel That is, upon informing that the HARQ ACK report of X % or more of the HARQ-ACK report for the transport block transmitted in the first subframe of every channel transmitted as per success in LBT among a plurality of channels is NACK, it is determined that a collision has occurred when sending the DL data burst.

As per another example of a method for increasing the CW size according to a result of HARQ NACK of the first subframe, the base station determines the size of the next CW based on the HARQ-ACK report for the transport block transmitted in the first subframe of the primary channel of the DL data burst transmitted during the COT secured in the primary channel and secondary channel as it succeeds FBE-scheme LBT on at least one or more secondary channels along with success in the LBE-scheme LBT on one primary channel That is, upon informing that the HARQ ACK report of X % or more of the HARQ-ACK report for the transport block transmitted in the first subframe of the DL burst of the primary channel is NACK, it is determined that a collision has occurred when sending the DL data burst.

As per another example of a method for increasing the CW size according to a result of HARQ NACK of the first subframe, the base station determines the size of the next CW based on the HARQ-ACK report for the transport block transmitted in the first subframe of each channel of the DL data burst transmitted during the COT secured in the primary channel and secondary channel as it succeeds FBE-scheme LBT on at least one or more secondary channels along with success in the LBE-scheme LBT on one primary channel That is, upon informing that the HARQ ACK report of X % or more of the HARQ-ACK report for the transport block transmitted in the first subframe of the DL burst of, even one, channel succeeding in transmission is NACK, it is determined that a collision has occurred when sending the DL data burst.

Figure 13:
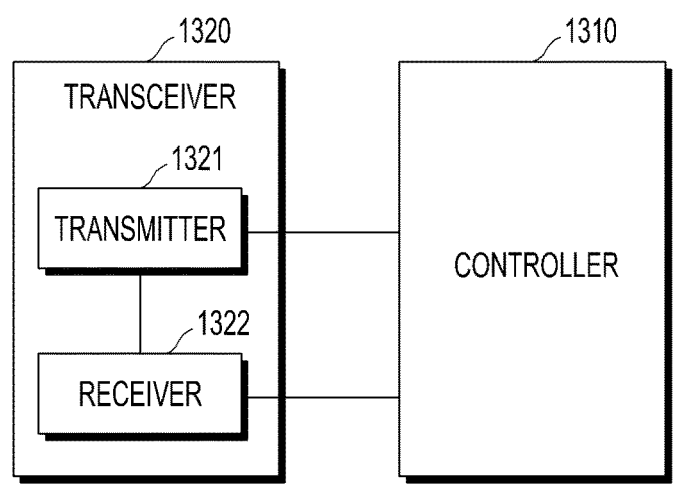
FIG. 13 is a view illustrating a configuration of a user equipment (UE) according to an embodiment of the present disclosure.

FIG. 13 is a view illustrating a configuration of a user equipment (UE) according to an embodiment of the present disclosure.

The UE may include a transceiver performing transmission and reception with another UE and a controller 1310 controlling all operations of the UE. In this disclosure, all of the above-described operations for supporting synchronization may be appreciated as being performed by the controller 1310. However, the controller and the transceiver 2710 are not necessarily implemented as separate devices, but may be implemented in a single configuration unit in the form of, e.g., a single chip.

It should be noted that the configuration of the LAA UE, the example of the method for transmitting LAA control/data signals, the example of the operational procedure of the LAA UE, the example configuration of the resource frame, and the configuration of the UE shown in FIGS. 1 to 14 do not intend to limit the scope of the present disclosure. In other words, all the components, entities, or operational steps illustrated in FIGS. 1 to 14 should not be construed as essential components to practice the present disclosure, and the present disclosure may be rather implemented with only some of the components without departing from the gist of the present disclosure.

The above-described operations of the base station or UE may be realized by equipping a memory device retaining their corresponding codes in the base station device or any component of the UE device. That is, the controller in the base station or UE device may execute the above-described operations by reading and running the program codes stored in the memory device by a processor or central processing unit (CPU).

As described herein, various components or modules in the entity, UE or base station device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for transmitting a signal on a channel of a wireless communication system, the method comprising:
    maintaining, by an electronic device, a counter for a first duration in which a discovery signal is transmitted but data is not transmitted;
    decreasing, by the electronic device, the maintained counter and sensing the channel for a second duration; and
    transmitting, by the electronic device, data on the channel if a value of the decreased counter is zero and the channel for the second duration is sensed to be idle.

2. The method of claim 1, further comprising decreasing, by the electronic device, the counter and sensing the channel for a third duration before maintaining the counter for the first duration.

3. The method of claim 1, wherein the counter is randomly set within a size of a contention window (Q) and the counter is zero or more than zero.

4. The method of claim 2, wherein thresholds in listen before talk (LBT) parameters are differently set for the third duration and the first duration.

5. The method of claim 3, wherein Q is set between a minimum value and a maximum value for a contention window (CW).

6. The method of claim 5, wherein the minimum value or the maximum value for the CW are differently set for the third duration and the first duration.

7. The method of claim 1, wherein if the channel for the second duration is sensed to be idle, the counter is decreased by one.

8. The method of claim 2, wherein the third duration is less than 1 ms.

9. A wireless communication system for transmitting a signal on a channel, the wireless communication system comprising:
    at least one transceiver; and at least one processor configured to:
- maintain a counter for a first duration in which a discovery signal is transmitted but data is not transmitted,
- decrease the maintained counter and sense the channel for a second period, and
- transmit data on the channel if a value of the decreased counter is zero and the channel for the second duration is sensed to be idle.

10. The wireless communication system of claim 9, wherein the at least one processor is further configured to decrease the counter and sense the channel for a third duration before maintaining the counter for the first duration.

11. The wireless communication system of claim 9, wherein the counter is randomly set within a size of a contention window (Q) and the counter is zero or more than zero.

12. The wireless communication system of claim 10, wherein thresholds in listen before talk (LBT) parameters are differently set for the third duration and the first duration.

13. The wireless communication system of claim 11, wherein Q is set between a minimum value and a maximum value for a contention window (CW).

14. The wireless communication system of claim 13, wherein the minimum value or the maximum value for the CW are differently set for the third duration and the first duration.

15. The wireless communication system of claim 9, wherein if the channel for the second duration is sensed to be idle, the counter is decreased by one.

16. The wireless communication system of claim 10, wherein the third duration is less than 1 ms.

* * * * *